(12) United States Patent
Umehara et al.

(10) Patent No.: US 9,438,855 B2
(45) Date of Patent: *Sep. 6, 2016

(54) TRANSMISSION MANAGEMENT SYSTEM, TRANSMISSION SYSTEM, PROGRAM FOR TRANSMISSION MANAGEMENT SYSTEM AND COMPUTER READABLE INFORMATION RECORDING MEDIUM

(75) Inventors: Naoki Umehara, Kanagawa (JP); Takahiro Asai, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 391 days.

This patent is subject to a terminal disclaimer.

(21) Appl. No.: 13/989,441

(22) PCT Filed: Nov. 24, 2011

(86) PCT No.: PCT/JP2011/077737
§ 371 (c)(1),
(2), (4) Date: May 24, 2013

(87) PCT Pub. No.: WO2012/074032
PCT Pub. Date: Jun. 7, 2012

(65) Prior Publication Data
US 2013/0242038 A1 Sep. 19, 2013

(30) Foreign Application Priority Data

Nov. 30, 2010 (JP) .................................. 2010-267699
Sep. 5, 2011 (JP) .................................. 2011-192542

(51) Int. Cl.
| H04N 7/15 | (2006.01) |
| H04L 12/18 | (2006.01) |
| H04N 7/14 | (2006.01) |

(52) U.S. Cl.
CPC ............ *H04N 7/15* (2013.01); *H04L 12/1818* (2013.01); *H04N 7/14* (2013.01)

(58) Field of Classification Search
USPC ....................................................... 348/14.12
See application file for complete search history.

(56) References Cited

U.S. PATENT DOCUMENTS

2007/0171274 A1* 7/2007 Yim .................... H04L 12/1813
348/14.08
2009/0137243 A1* 5/2009 Tsutsumi ............ H04L 12/1827
455/426.1

FOREIGN PATENT DOCUMENTS

| JP | 02-026429 | 1/1990 |
| JP | 2005-286600 | 10/2005 |

(Continued)

OTHER PUBLICATIONS

International Search Report Issued Dec. 27, 2011 in PCT/JP2011/077737 Filed Nov. 24, 2011.

(Continued)

*Primary Examiner* — Amal Zenati
(74) *Attorney, Agent, or Firm* — Oblon, McClelland, Maier & Neustadt, L.L.P.

(57) ABSTRACT

A transmission management system, when content data is communicated among plural transmission terminals via a communication network, selects a relay apparatus which relays the content data. The system determines whether first attributes of the respective plural transmission terminals are the same; determines whether second attributes of the respective plural transmission terminals are the same; and selects a first relay apparatus in a case where the first attributes are determined to be the same, selects a second relay apparatus in a case where the first attributes are not determined to be the same but the second attributes are determined to be the same, and selects a third relay apparatus in a case where the first attributes are not determined to be the same and the second attributes are not determined to be the same.

9 Claims, 26 Drawing Sheets

(56) References Cited

FOREIGN PATENT DOCUMENTS

| JP | 2006-229416 | 8/2006 |
|----|-------------|--------|
| JP | 2007-142903 | 6/2007 |
| JP | 2008-227577 | 9/2008 |
| JP | 2012-050063 | 3/2012 |
| WO | 2012/014824 A1 | 2/2012 |

OTHER PUBLICATIONS

Office Action mailed Dec. 5, 2014, in co-pending U.S. Appl. No. 14/086,467.

* cited by examiner

FIG.7

| IP ADDRESS OF RELAY DESTINATION TERMINAL | IMAGE QUALITY (QUALITY OF IMAGE) OF IMAGE DATA TO BE RELAYED |
|---|---|
| 1.3.2.4 | HIGH IMAGE QUALITY |
| 1.3.1.3 | LOW IMAGE QUALITY |
| 1.3.2.3 | MEDIUM IMAGE QUALITY |
| ... | ... |

FIG.9

| RELAY APPARATUS ID | OPERATING STATE | NUMBER OF PORTS USED | NUMBER OF PORTS USABLE | RECEPTION DATE AND TIME | IP ADDRESS | MAXIMUM DATA TRANSMISSION RATE (Mbps) |
|---|---|---|---|---|---|---|
| 111a | ON-LINE | 10 | 100 | 2009.11.10.13:00 | 1.2.1.2 | 100 |
| 111ab | ON-LINE | 3 | 100 | 2009.11.10.13:10 | 1.4.1.2 | 1000 |
| ... | ... | ... | ... | ... | ... | ... |
| 111d | OFF-LINE | 4 | 100 | 2009.11.10.13:20 | 1.3.2.2 | 1000 |
| 111cd | ON-LINE | 9 | 100 | 2009.11.10.13:30 | 1.5.1.2 | 10 |
| ... | ... | ... | ... | ... | ... | ... |
| 111abcd | ON-LINE | 10 | 100 | 2009.11.10.13:40 | 1.1.1.3 | 100 |
| ... | ... | ... | ... | ... | ... | ... |

FIG.10

| TERMINAL ID | PASSWORD |
|---|---|
| 01aa | aaaa |
| 01ab | abab |
| 01ba | baba |
| ... | ... |

FIG.11

| TERMINAL ID | DESTINATION NAME | OPERATING STATE | RECEPTION DATE AND TIME | IP ADDRESS OF TERMINAL |
|---|---|---|---|---|
| 01aa | A COMPANY TOKYO OFFICE AA TERMINAL | ON-LINE (TELEPHONE CALL POSSIBLE) | 2009.11.10.13:40 | 1.2.1.3 |
| 01ab | A COMPANY TOKYO OFFICE AB TERMINAL | OFF-LINE | 2009.11.09.12:00 | 1.2.1.4 |
| ... | ... | ... | ... | ... |
| 01ba | B COMPANY OSAKA OFFICE BA TERMINAL | ON-LINE (TEMPORARILY INTERRUPTED) | 2009.11.10.13:45 | 1.2.2.3 |
| 01bb | B COMPANY OSAKA OFFICE BB TERMINAL | ON-LINE (TELEPHONE CALL POSSIBLE) | 2009.11.10.13:50 | 1.2.2.4 |
| ... | ... | ... | ... | ... |
| 01ca | C COMPANY NEW YORK OFFICE CA TERMINAL | OFF-LINE | 2009.11.10.12:45 | 1.3.1.3 |
| 01cb | C COMPANY NEW YORK OFFICE CB TERMINAL | ON-LINE (ON TELEPHONE CALL) | 2009.11.10.13:55 | 1.3.1.4 |
| ... | ... | ... | ... | ... |
| 01da | D COMPANY WASHINGTON OFFICE DA TERMINAL | ON-LINE (ON TELEPHONE CALL) | 2009.11.08.12:45 | 1.3.2.3 |
| 01db | D COMPANY WASHINGTON OFFICE DB TERMINAL | ON-LINE (TELEPHONE CALL POSSIBLE) | 2009.11.10.12:45 | 1.3.2.4 |
| ... | ... | ... | ... | ... |

FIG.12

| REQUEST SOURCE TERMINAL ID | DESTINATION TERMINAL ID |
|---|---|
| 01aa | 01ab,···,01ba,01bb,···,01ca,01cb,01da,01db |
| 01ab | 01aa,01ca,01cb |
| 01ba | 01aa,01ab,01ca,01cb,01da,01db |
| ⋮ | ⋮ |
| 01db | 01aa,01ab,01da,···,01ca,01cb,···,01da |

FIG.13

| SESSION ID | RELAY APPARATUS ID | REQUEST SOURCE TERMINAL ID | DESTINATION TERMINAL ID | DELAY TIME (ms) | DELAY INFORMATION RECEPTION DATE AND TIME |
|---|---|---|---|---|---|
| se1 | 111a | 01aa | 01bb,01cb,01db | 200 | 2009.11.10.14:00 |
| se2 | 111b | 01ba | 01ca | 50 | 2009.11.10.14:10 |
| se3 | 111d | 01bb | 01da | 400 | 2009.11.10.14:20 |
| ... | ... | ... | ... | ... | ... |

FIG.14

| DELAY TIME (ms) | IMAGE QUALITY (QUALITY OF IMAGE) OF IMAGE DATA |
|---|---|
| 0~100 | HIGH IMAGE QUALITY |
| 100~300 | MEDIUM IMAGE QUALITY |
| 300~500 | LOW IMAGE QUALITY |
| 500~ | (INTERRUPTION) |

FIG.15

| TERMINAL ID | INTRANET RELAY APPARATUS ID | SEGMENT RELAY APPARATUS ID |
|---|---|---|
| 01aa | 111a | 111ab |
| 01ab | 111a | 111ab |
| ... | ... | ... |
| 01ba |  | 111ab |
| 01bb |  | 111ab |
| ... | ... | ... |
| 01ca |  | 111cd |
| 01cb |  | 111cd |
| ... | ... | ... |
| 01da | 111d | 111cd |
| 01db | 111d | 111cd |
| ... | ... | ... |

FIG.21

DESTINATION LIST

| | A COMPANY TOKYO OFFICE AB TERMINAL | B COMPANY OSAKA OFFICE BA TERMINAL | C COMPANY NEW YORK OFFICE CA TERMINAL | D COMPANY WASHINGTON OFFICE DA TERMINAL |
| --- | --- | --- | --- | --- |
| | A COMPANY TOKYO OFFICE AC TERMINAL | B COMPANY OSAKA OFFICE BB TERMINAL | C COMPANY NEW YORK OFFICE CB TERMINAL | D COMPANY WASHINGTON OFFICE DB TERMINAL |
| | A COMPANY TOKYO OFFICE AD TERMINAL | B COMPANY OSAKA OFFICE BC TERMINAL | C COMPANY NEW YORK OFFICE CC TERMINAL | D COMPANY WASHINGTON OFFICE DC TERMINAL |
| | A COMPANY TOKYO OFFICE AE TERMINAL | B COMPANY OSAKA OFFICE BD TERMINAL | C COMPANY NEW YORK OFFICE CD TERMINAL | D COMPANY WASHINGTON OFFICE DD TERMINAL |
| | A COMPANY TOKYO OFFICE AF TERMINAL | B COMPANY OSAKA OFFICE BE TERMINAL | C COMPANY NEW YORK OFFICE CE TERMINAL | D COMPANY WASHINGTON OFFICE DE TERMINAL |
| | A COMPANY TOKYO OFFICE AG TERMINAL | B COMPANY OSAKA OFFICE BF TERMINAL | C COMPANY NEW YORK OFFICE CF TERMINAL | D COMPANY WASHINGTON OFFICE DF TERMINAL |

TRANSMISSION MANAGEMENT SYSTEM, TRANSMISSION SYSTEM, PROGRAM FOR TRANSMISSION MANAGEMENT SYSTEM AND COMPUTER READABLE INFORMATION RECORDING MEDIUM

TECHNICAL FIELD

The present invention relates to a transmission management system by which when content data is communicated using a communication network among plural communication terminals, a relay apparatus which relays the content data is selected.

BACKGROUND ART

Along with a recent tendency of reducing business trip costs and business trip man hours, transmission systems for carrying out a TV conference using a communication network such as the Internet have become wide spread. In such a transmission system, when a telephone call is carried out between plural transmission terminals, image data and voice data are transmitted therebetween, and thus, a TV conference can be carried out.

Further, thanks to recent expansion of the broadband environment, transmission of image data with high image quality and voice data with high sound quality becomes possible. Thereby, a situation of another person in a TV conference becomes able to be easily understood, and it becomes possible to understand each other by conversation at a high level.

In such a TV conference system, in order to relay content data among TV conference terminals, a relay apparatus is provided in general. In this case, it is known to select a relay apparatus from among plural relay apparatuses depending on attributes of the TV conference terminals participating in the TV conference, for the purpose of load sharing in a communication network or such. For example, it is known that a conference room ID (identification) is allocated to a TV conference terminal, and a relay apparatus is selected based on the conference ID of the TV conference terminal participating in the TV conference (see Japanese Laid-Open Patent Application No. 2006-229416). Thereby, it is possible to average traffic in relay apparatuses, and thus, it is possible to share the load of the communication network to a certain extent.

However, in the above-mentioned TV conference system according to the related art, although it is possible to select a relay apparatus based on the conference ID of the TV conference terminal, it may not be possible to select an optimum relay apparatus depending on plural independent attributes such as a communication network to which the TV conference terminal is connected, an area in which respective transmission terminals are connected with a communication network, and so forth.

SUMMARY OF INVENTION

According to an embodiment of the present invention, there is a transmission management system which, when content data is communicated among plural transmission terminals via a communication network, selects a relay apparatus which relays the content data. The transmission management system includes a first attribute determination part configured to determine whether first attributes of the respective transmission terminals are the same; a second attribute determination part configured to determine whether second attributes of the respective transmission terminals are the same; and a selection part configured to select a first relay apparatus in a case where the first attribute determination part has determined that the first attributes are the same, select a second relay apparatus in a case where the first attribute determination part has determined that the first attributes are not the same but the second attribute determination part has determined that the second attributes are the same, and select a third relay apparatus in a case where the first attribute determination part has determined that the first attributes are not the same and the second attribute determination part has determined that the second attributes are not the same.

Other objects, features and advantages of the present invention will become more apparent from the following detailed description when read in conjunction with the accompanying drawings.

BRIEF DESCRIPTION OF DRAWINGS

FIG. 7 shows a concept of a change quality management table;

FIG. 9 shows a concept of a relay apparatus management table;

FIG. 10 shows a concept of a terminal authentication management table;

FIG. 11 shows a concept of a terminal management table;

FIG. 12 shows a concept of a destination list management table;

FIG. 13 shows a session management table;

FIG. 14 shows a quality management table;

FIG. 15 shows an attribute management table;

FIG. 21 shows a concept of a destination list according to the embodiment;

DESCRIPTION OF EMBODIMENTS

According to the embodiment of the present invention, a transmission system selects a first relay apparatus in a case where a first attribute determination part has determined that first attributes are the same, selects a second relay apparatus in a case where the first attribute determination part has determined that the first attributes are not the same but a second attribute determination part has determined that second attributes are the same, and selects a third relay apparatus in a case where the first attribute determination part has determined that the first attributes are not the same and the second attribute determination part has determined that the second attributes are not the same. Thereby, it is possible to select an optimum relay apparatus depending on the plural independent attributes.

Overall Configuration of Embodiment

Figure 1A:
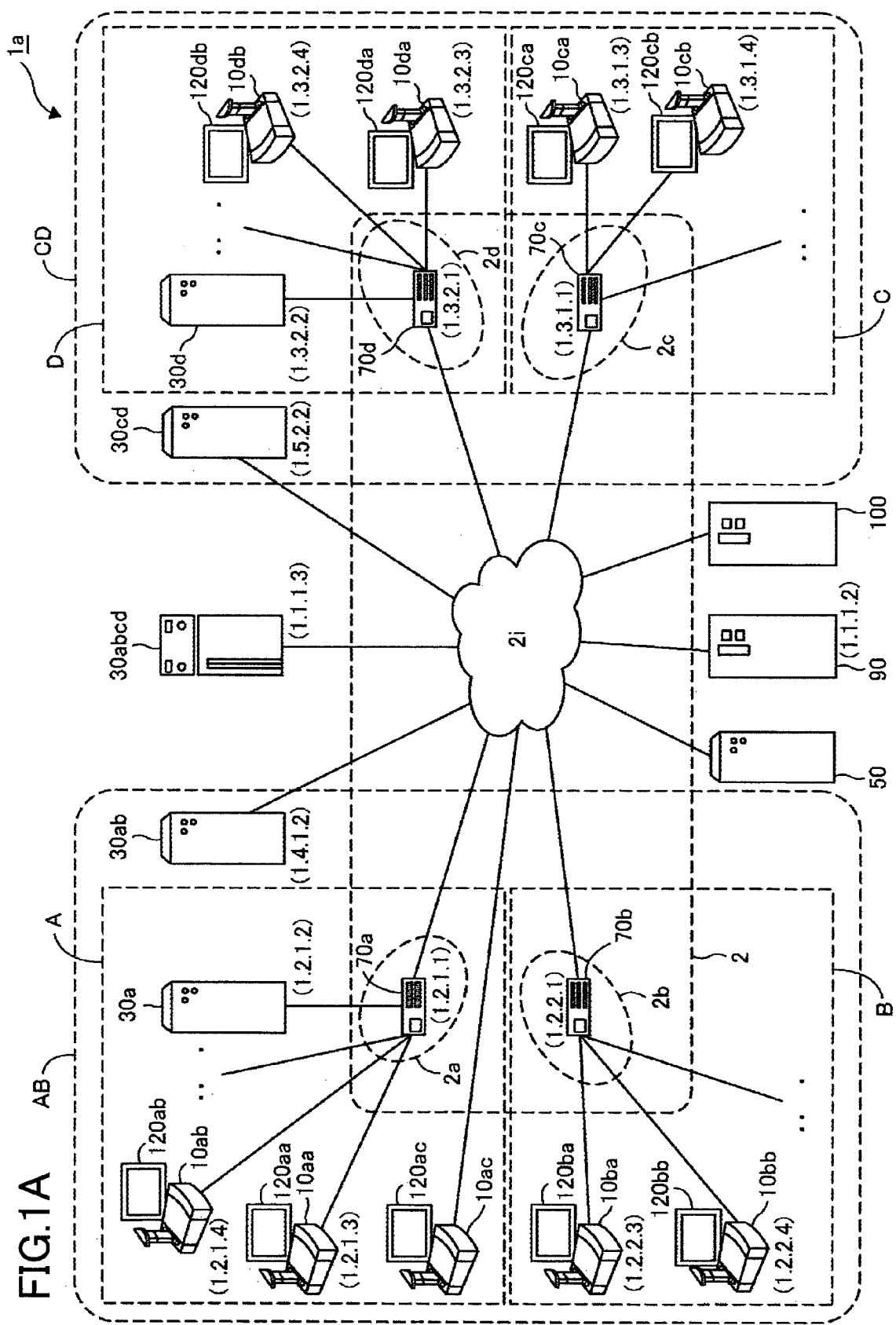
FIG. 1A generally shows one example of a transmission system according to an embodiment of the present invention.
Figure 1B:
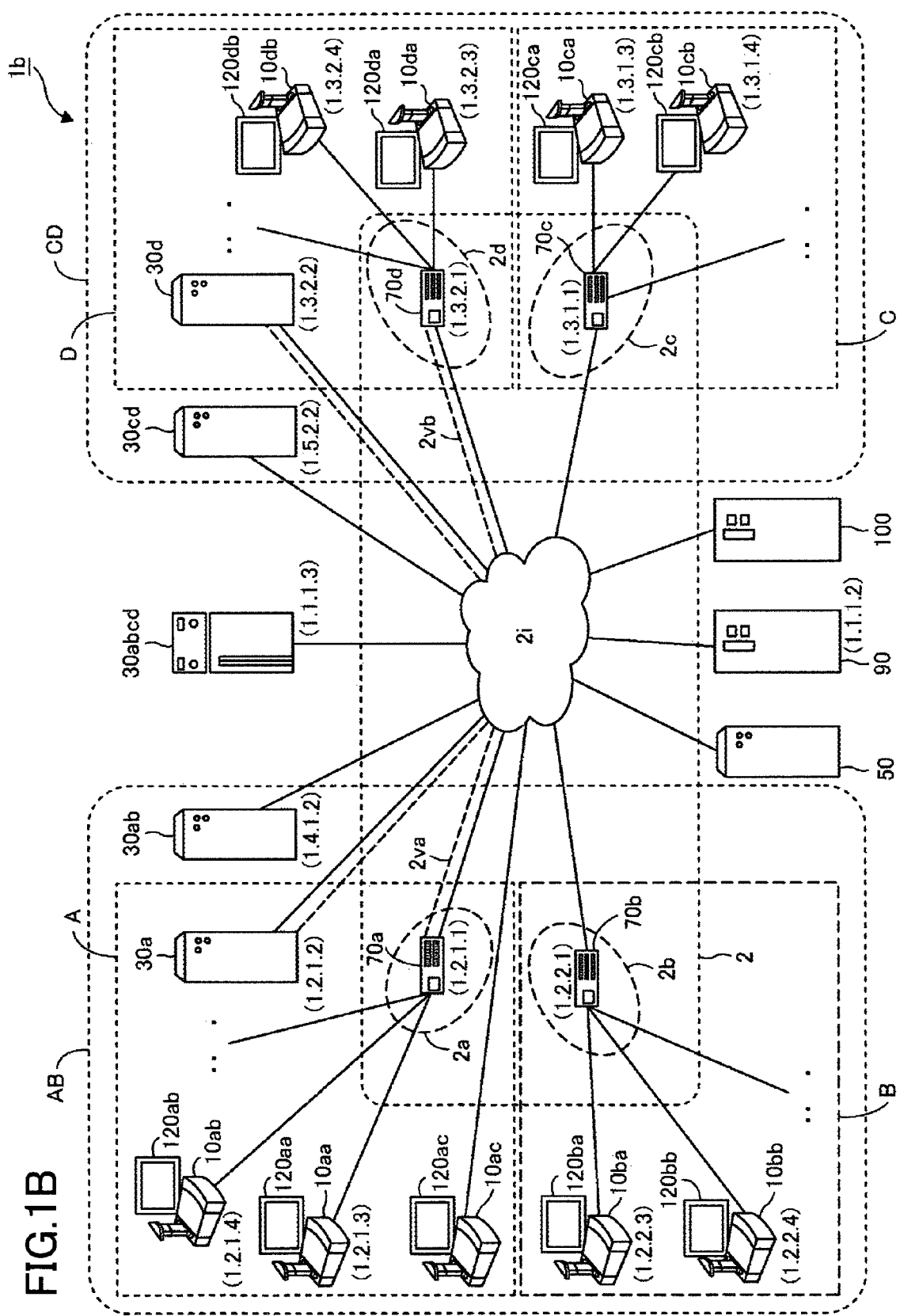
FIG. 1B generally shows another example of the transmission system according to the embodiment of the present invention.

Below, with reference to FIGS. 1A through 24, the embodiment of the present invention will be described. First, with reference to FIGS. 1A and 1B, the embodiment of the present invention will be generally described. FIGS. 1A and 1B generally show examples of respective transmission systems 1a and 1b according to the embodiment.

The transmission system 1a or 1b may be a data providing system transmitting content data in one direction from one transmission terminal 10 to another transmission terminal 10 via a transmission management system, or a communication system transmitting information, feelings or such between plural transmission terminals 10 mutually via a transmission management system. The communication system is a system for mutually transmitting information, feelings or such between plural communication terminals (corresponding to "transmission terminals") via a communication management system 10 (corresponding to a "transmission management system"), and may be, as an example, a TV conference system, a teleconference system, a voice conference system, a voice telephone system, a PC (personal computer) screen sharing system, or such.

According to the embodiment, the transmission system, the transmission management system and the transmission terminals will be described supposing a TV conference system as one example of the communication system, supposing a TV conference management system as one example of the communication management system and supposing a TV conference terminal as one example of the communication terminal. That is, the transmission terminals and the transmission management system according to the embodiment of the present invention may be applied not only to a TV conference system, but also to a communication system or a transmission system. It is noted that the above-mentioned "TV conference" may also be called "video conference" or such.

The transmission system 1a shown in FIG. 1A includes plural transmission terminals (10aa, 10ab, . . . ), display devices (120aa, 120ab, . . . ) for the respective transmission terminals (10aa, 10ab, . . . ), plural relay apparatuses (30a, 30ab, 30cd, 30d and 30abcd), a transmission management system 50, a program providing system 90 and a maintenance system 100.

It is noted that hereinafter, "transmission terminals" may be simply referred to as "terminals", and "transmission management system" may be simply referred to as "management system". Further, any terminal of the plural terminals (10aa, 10ab, . . . ) may be referred to as a "terminal 10". Any display device of the plural display devices (120aa, 120ab, . . . ) may be referred to as a "display device 120". Any one of the plural relay apparatuses (30a, 30ab, 30cd, 30d and 30abcd) may be referred to as a "relay apparatus 30".

The terminal 10 carries out transmission of image data and voice data as examples of content data through transmission/reception of image data and voice data. That is, a telephone call according to the embodiment includes not only transmission and reception of voice data but also transmission and reception of image data. Thus, the terminal 10 according to the embodiment transmits and receives image data and voice data. However, the terminal 10 may transmit and receive voice data without transmitting and receiving image data.

It is noted that according to the embodiment, description will be made where images of the image data are video (moving picture) images. However, images of the image data may be static images instead of video (moving picture) images. Further, images of the image data may include both video (moving picture) images and static images. Further, the relay apparatus 30 relays image data and voice data among plural terminals 10. The management system 50 manages the terminals 10 and the relay apparatuses 30 in a unifying manner.

Further, plural routers (70a, 70b, 70c, 70d) select optimum paths for image data and voice data. It is noted that hereinafter, any one of the plural routers (70a, 70b, 70c, 70d) may be referred to as a "router 70".

The program providing system 90 includes a HD (Hard Disk) (described later with reference to FIG. 4), stores a program for the terminals 10 for each of the terminals 10 to carry out various functions (or causing each of the terminals 10 to function as various functional parts), and is capable of transmitting the program for the terminals 10 to each of the terminals 10. Further, the HD of the program providing system 90 also stores a program for the relay apparatuses 30 for each of the relay apparatuses 30 to carry out various functions (or causing each of the relay apparatuses 30 to function as various functional parts), and capable of transmitting the program for the relay apparatuses 30 to each of the relay apparatuses 30. Further, the HD of the program providing system 90 also stores a program for transmission management for the management system 50 to carry out various functions (or causing the management system 50 to function as various functional parts), and capable of transmitting the program for transmission management to the management system 50.

The maintenance system 100 is a computer carrying out maintenance or management of at least one of the terminals 10, the relay apparatuses 30, the management system 50 and the program providing system 90. For example, in a case where the maintenance system 100 is installed in the home country, and any one of the terminals 10, the relay apparatuses 30, the management system 50 and the program providing system 90 are installed abroad, the maintenance system 100 carries out maintenance, management or such of at least one of the terminals 10, the relay apparatuses 30, the management system 50 and the program providing system 90 remotely via the communication network 2. Further, the maintenance system 100 may carry out maintenance, management and so forth of a model number, a production number, a sales destination, maintenance inspection or a history of failures of at least one of the terminals 10, the relay apparatuses 30, the management system 50 and the program providing system 90 without using the communication network 2.

Further, the terminals (10aa, 10ab, . . . ), the relay apparatus 30a and the router 70a are connected together by a LAN 2a in such a manner that they can carry out mutual communication, and are included in an intranet A. The terminals (10ba, 10bb, . . . ) and the router 70b are connected together by a LAN 2b in such a manner that they can carry out mutual communication, and are included in an intranet B. For example, the intranet A is managed by an "A" company, and the LAN 2a is provided within a Tokyo office. The intranet B is managed by a "B" company, and the LAN 2b is provided within an Osaka office. Further, the LAN 2a and the LAN 2b are provided in a segment AB. "Segments" means divisions (areas or regions) divided in terms of the communication network 2 or according to geographic positions. The segment AB is, for example, Japan.

On the other hand, the terminals (10ca, 10cb, . . . ) and the router 70c are connected together by a LAN 2c in such a manner that they can carry out mutual communication, and are included in an intranet C. The terminals (10da, 10db, . . . ), the relay apparatus 30d and the router 70d are connected together by a LAN 2d in such a manner that they can carry out mutual communication, and are included in an intranet D. For example, the intranet C is managed by a "C" company and the LAN 2c is provided within a New York office. The intranet D is managed by a "D" company and the LAN 2d is provided within a Washington D.C. office. Further, the LAN 2c and the LAN 2d are provided in a segment CD. The segment CD is, for example, USA. The intranet A, intranet B, intranet C and intranet D are connected in such a manner that they can carry out mutual communication by using the routers (70a, 70b, 70c and 70d), respectively, and using the Internet 2i. It is noted that firewalls are provided between the respective intranets (A, B, C and D) and the Internet 2i.

Further, the terminal 10 has mobility, and may be connected with the Internet 2i from an area different from an area where the terminal 10 is usually installed, and may communicate content data with another terminal 10 via a relay apparatus 30. For example, the terminal 10ac may be connected with the intranet A via the Internet 2i from an area different from an area (Tokyo) where the terminal 10ac is usually installed, and may communicate content data with another terminal via a relay apparatus 30.

Further, as in the transmission system 1b shown in FIG. 1B, the relay apparatuses (30a, 30d) may be connected to the LANs (2a, 2d) respectively through VPN (Virtual Private Network) connections (2va, 2vb). Thereby, the relay apparatus 30a may be installed in an area (for example, a data center of a company which provides the transmission system 1b) different from an area (the Tokyo office of the A company) for which the LAN 2a is provided. It is noted that the transmission system 1b of FIG. 1B has the same configuration as the transmission system 1a of FIG. 1A except that the relay apparatuses (30a, 30d) are connected with the LANs (2a, 2d) respectively using the VPN connections. It is noted that according to the embodiment, in a case where any one of the transmission systems 1a and 1b is referred to, "transmission system 1" is used.

In the transmission system 1 according to the embodiment, the relay apparatus 30a is connected with the terminals (10aa, 10ab, . . . ) and the management system 50 via the communication network 2 in such a manner that they can communicate with each other. The relay apparatus 30a is installed in the LAN 2a or VPN 2va for the purpose of making the communication paths more efficient. The relay apparatus 30a is used to relay content data in a case where the terminals (10aa, 10ab, . . . ) carry out telephone calls with other terminals 10 installed in the LAN 2a.

In the transmission system 1 according to the embodiment, the relay apparatus 30d is connected with the terminals (10da, 10db, . . . ) and the management system 50 via the communication network 2 in such a manner that they can communicate with each other. The relay apparatus 30d is installed in the LAN 2d or VPN 2vb for the purpose of making the communication paths more efficient. The relay apparatus 30d is used to relay content data in a case where the terminals (10da, 10db, . . . ) carry out telephone calls with other terminals 10 installed in the LAN 2d.

In the transmission system 1 according to the embodiment, the relay apparatus 30ab is connected with the terminals (10aa, 10ab, . . . , 10ba, 10bb, . . . ) and the management system 50 via the communication network 2 in such a manner that they can communicate with each other. The relay apparatus 30ab is installed in an area other than the area A and area B for the purpose of not easily being influenced by the communication amount in the local area network of the area A or area B. The relay apparatus 30ab is used to relay content data in a case where the terminals (10aa, 10ab, . . . , 10ba, 10bb, . . . ) carry out telephone calls with other terminals 10 installed in the LANs (2a, 2b) (hereinafter, also referred to as a "segment AB").

In the transmission system 1 according to the embodiment, the relay apparatus 30cd is connected with the terminals (10ca, 10cb, . . . , 10da, 10db, . . . ) and the management system 50 via the communication network 2 in such a manner that they can communicate with each other. The relay apparatus 30cd is installed in an area other than the area C and area D for the purpose of not easily being influenced by the communication amount in the local area network of the area C or area D. The relay apparatus 30ab is used to relay content data in a case where the terminals (10ca, 10cb, . . . , 10da, 10db, . . . ) carry out telephone calls with other terminals installed in the LANs (2c, 2d) (hereinafter, also referred to as a "segment CD").

In the transmission system 1 according to the embodiment, the relay apparatus 30abcd is connected with the terminals (10aa, 10ab, . . . , 10ba, 10bb, . . . , 10ca, 10cb, . . . , 10da, 10db, . . . ) and the management system 50 via the communication network 2 in such a manner that they can communicate with each other. The relay apparatus 30abcd is installed in an area other than the area A, area B, area C and area D for the purpose of not easily being influenced by the communication amount in the local area network of the area A, area B, area C or area D. The relay apparatus 30abcd is used to relay content data in a case where the terminals (10aa, 10ab, . . . , 10ba, 10bb, . . . , 10ca, 10cb, . . . , 10da, 10db, . . . ) carry out telephone calls with other terminals installed in the LANs (2a, 2b, 2c, 2d).

Further, in the transmission system 1 according to the embodiment, the management system 50 and the program providing system 90 are connected with the terminals 10 and the relay apparatuses 30 in such a manner that they can carry out mutual communication by the Internet 2*i*. The management system 50 and the program providing system 90 may be installed in the area A, area B, area C or area D, or may be installed in another area.

It is noted that in the embodiment, the communication network 2 includes the LAN 2*a*, the LAN 2*b*, the Internet 2*i*, the LAN 2*c* and the LAN 2*d*. The communication network 2 may include not only parts where cable communication is carried out, but also parts where radio communication is carried out.

Further, in FIG. 1A or 1B, four sets of numerals below each of the terminals 10, the relay apparatuses 30, the management system 50, the routers 70 and the program providing system 90 show an IP address according to the common IPv4 in a simplified manner. For example, the IP address of the terminal 10*aa* is "1.2.1.3". IPv6 may be used instead of IPv4. However, for the sake of simplifying the description, the description will be made supposing to use IPv4.

Hardware Configuration of Embodiment

Figure 2:
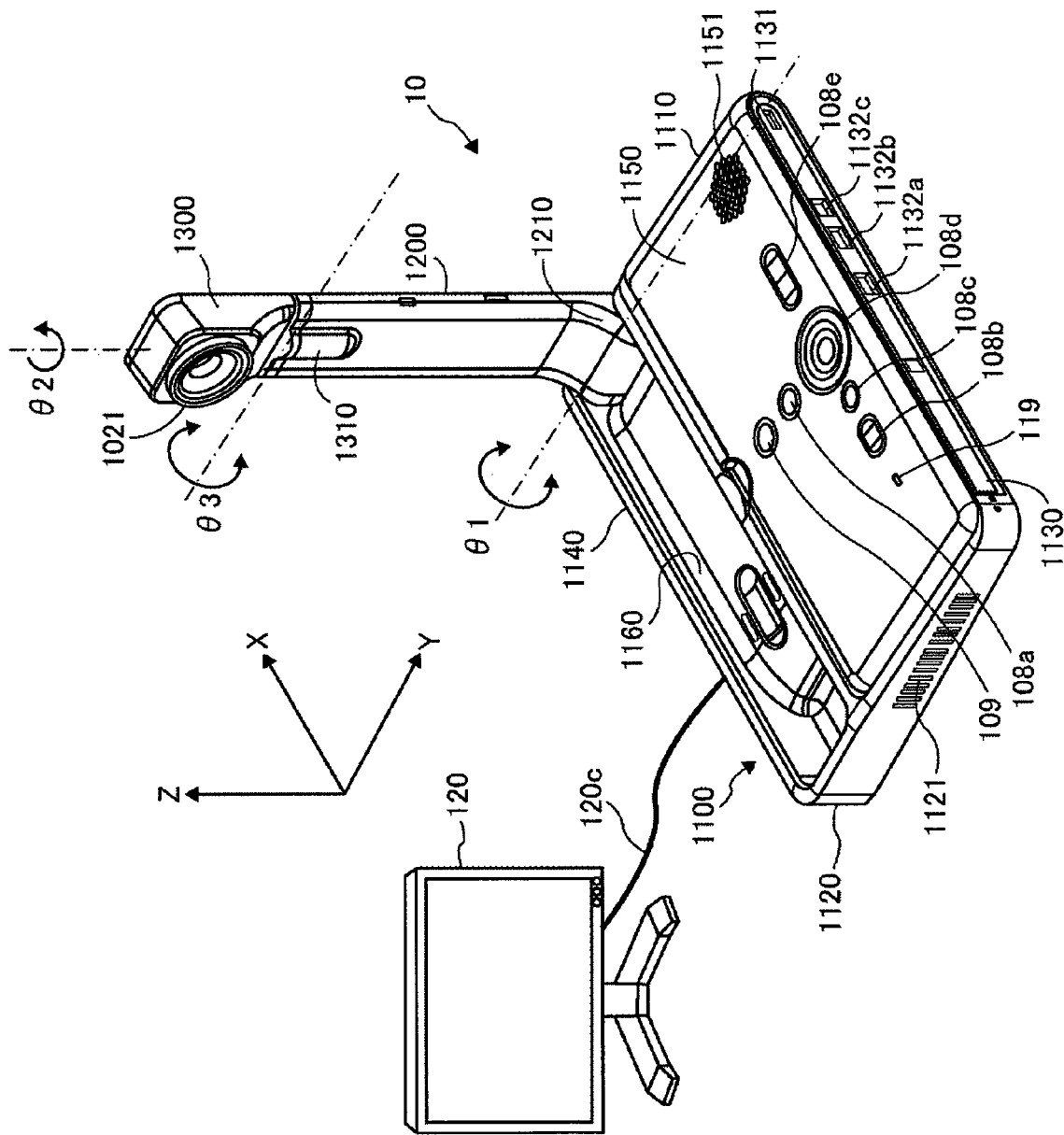
FIG. 2 shows an external appearance in one example of a transmission terminal according to the embodiment.

Next, a hardware configuration of the embodiment will be described. FIG. 2 shows one example of an external appearance of the terminal 10 according to the embodiment. Below, a longitudinal direction of the terminal 10 is referred to as an X-axis direction, a direction perpendicular to the X-axis direction on the horizontal plane is referred to as a Y-axis direction and a direction (vertical direction) perpendicular to the X-axis direction and the Y-axis direction is referred to as a Z-axis direction.

As shown in FIG. 2, the terminal 10 includes a housing 1100, an arm 1200 and a camera housing 1300. On a rear side wall 1110 of the housing 1100, an air suction surface (not shown) including plural air suction holes is provided. On a front side wall 1120 of the housing 1100, an air discharge surface 1121 including plural air discharge holes is provided. Thereby, as a result of a cooling fan (not shown) provided in the inside of the housing 1100 being driven, air behind the terminal 10 is taken in via the air suction surface, and the air is discharged to the front side of the terminal 10 via the air discharge surface 1121. On a right side wall 1130 of the housing 1100, a sound collecting hole 1131 is formed, and voice, sound, noise or such is collected by means of a microphone 114 provided in the inside of the housing 1100 described later.

On a top surface of the housing 1100 at an area near the right side wall 1130, an operations panel 1150 is provided. On the operations panel 1150, plural operating buttons (108*a* through 108*e*) described later, a power supply switch 109 described later and an alarm lamp 119 described later are provided. Also, on the operations panel 1150, a sound output surface 1151 including plural sound output holes formed for passing through output sound from a speaker 115 provided in the inside of the housing 1100 described later is provided. Further, on the top surface of the housing 1100 at an area near a left side wall 1140, a holding hole 1160 as a depression for receiving the arm 1200 and the camera housing 1300 is provided. On the right side wall 1130 of the housing 1100, plural connection holes (1132*a* through 1132*c*) are provided for electrically connecting cables to an external apparatus connecting I/F 118 described later. On the other hand, on the left side wall 1140 of the housing 1100, a connection hole (not shown) is provided for electrically connecting a cable 120*c* for the display device 120 to the external apparatus connecting I/F 118.

It is noted that hereinafter, in a case where any operating button of the operating buttons (108*a* through 108*e*) is referred to, this will be generally referred to as an "operating button 108". Similarly, in a case where any connection hole of the connection holes (1132*a* through 1132*e*) is generally referred to, this will be referred to as a "connection hole" 1132.

The arm 1200 is mounted on the housing 1100 via a torque hinge 1210, and is configured to be able to rotate vertically in a range of a tilt angle θ1 of 135° with respect to the housing 1100. FIG. 2 shows a state where the tilt angle θ1 is 90°.

A camera 112 in a built-in type described later is provided in the camera housing 1300, and the user, a document, the room and so forth can be photographed. Further, a torque hinge 1310 is formed in the camera housing 1300. The camera housing 1300 is mounted on the arm 1200 via the torque hinge 1310, and thus a configuration is provided such that the camera housing 1300 can be rotated vertically and horizontally with respect to the arm 1200, in a range of a pan angle θ2 of ±180° and in a range of a tilt angle θ3 of ±45°, where FIG. 2 shows a state of 0°.

It is noted that each of the relay apparatuses 30, the management system 50, the program providing system 90 and the maintenance system 100 has an external appearance the same as that of a common server computer. Therefore, description of the external appearances thereof will be omitted.

Figure 3:
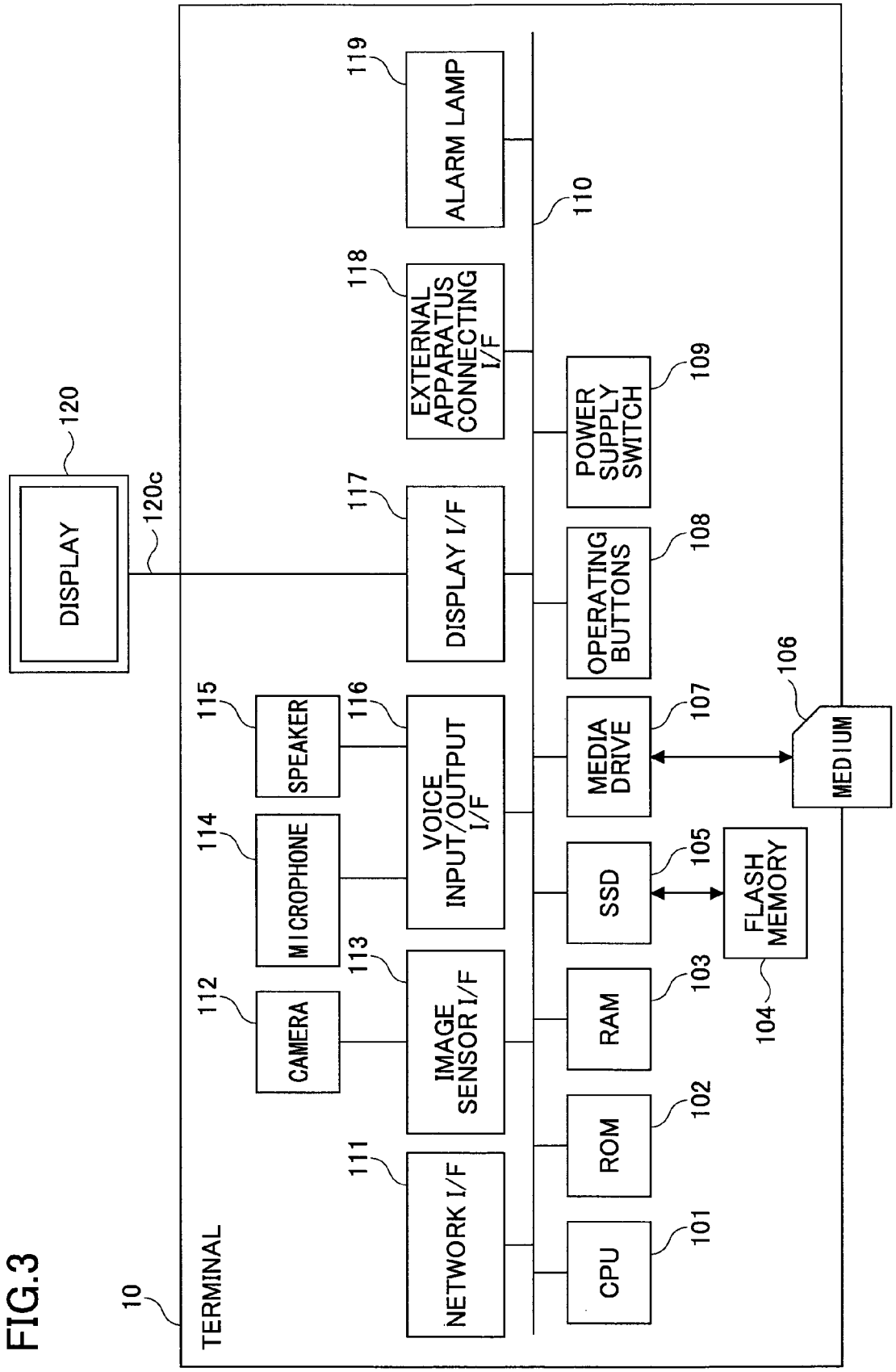
FIG. 3 shows a hardware configuration of the transmission terminal according to the embodiment.

FIG. 3 shows a hardware configuration of the terminal 10 according to the embodiment. As shown in FIG. 3, the terminal 10 according to the embodiment includes a CPU (Central Processing Unit) 101 controlling operations of the entirety of the terminal 10; a ROM (Read Only Memory) 102 storing a program for the terminals 10; a RAM (Random Access Memory) 103 used as a work area of the CPU 101; and a flash memory 104 storing various data such as image data and voice data. The terminal 10 according to the embodiment further includes a SSD (Solid State Drive) 105 controlling reading and writing various data from and to the flash memory 104 according to the control of the CPU 101; a media drive 107 controlling reading and writing (recording) data from and to a recording medium 106 such as a flash memory; the operating buttons 108 operated by the user in a case where the user selects a destination of the terminal 10 or so; the power supply switch 109 for switching turning on/off of the power supply in the terminal 10; and a network I/F (InterFace) 111 for transmitting data using the communication network 2 described later.

Further, the terminal 10 includes the camera 112 of a built-in type photographing an object and obtaining image data according to the control of the CPU 101; an image sensor I/F 113 controlling driving the camera 112; the microphone 114 of a built-in type inputting voice; the speaker 115 of a built-in type outputting voice; a voice input/output I/F 116 processing input and output of voice signals from the microphone 114 and to the speaker 115 according to the control of the CPU 101; and a display I/F 117 transmitting image data to the display device 120 provided in the outside according to the control of the CPU 101. The terminal 10 further includes the external apparatus connecting I/F 118 for connecting various types of external apparatuses inserted in the connection hole 1132 shown in FIG. 2; the alarm lamp 119 reporting unusual conditions of various functions of the terminal 10; and bus lines 110 such as an address bus, a data bus and so forth for electrically connecting the above-mentioned various elements/components as shown in FIG. 3.

The display device 120 is a display part made of a liquid crystal, an organic electroluminescence (EL) material or such displaying an image of an object, operating icons, or such. Further, the display device 120 is connected with the display I/F 117 by the cable 120c. The cable 120c may be a cable for an analog RGB (VGA) signal, a cable for a component video signal, a cable for HDMI (High-Definition Multimedia Interface), a cable for a DVI (Digital Video Interactive) signal, or such.

The camera 112 includes a lens and a solid state image sensor converting light into electric charge and obtaining a signal of an image (video) of an object. As the solid state image sensor, a CMOS (Complementary Metal Oxide Semiconductor) device, a CCD (Charge Coupled Device) or such may be used.

To the external apparatus connecting I/F 118, external apparatuses (not shown) such as a camera provided in the outside, a microphone provided in the outside, a speaker provided in the outside or such may be electrically connected by a USB (Universal Serial Bus) cable or such. In a case where the camera provided in the outside is connected, the cameral provided in the outside is driven with a higher priority than the camera 112 of the built-in type according to the control of the CPU 101. In a case where the microphone provided in the outside or the speaker provided in the outside is connected, the microphone provided in the outside or the speaker provided in the outside is driven with a higher priority than the microphone 114 of the built-in type or the speaker 115 of the built-in type according to the control of the CPU 101.

It is noted that the recording medium 106 is freely detachable from the terminal 10. Further instead of the flash memory 104, an EEPROM (Electrically Erasable and Programmable ROM) or such may be used as long as it is a non-volatile memory for reading and writing data according the control of the CPU 101.

The above-mentioned program for the terminals 10 may be recorded in a computer readable information recording medium (the recording medium 106 or such) in a form of a file of an installable type or an executable type, and be circulated. Further, the program for the terminals 10 may be stored in the ROM 102 instead of the flash memory 104.

Figure 4:
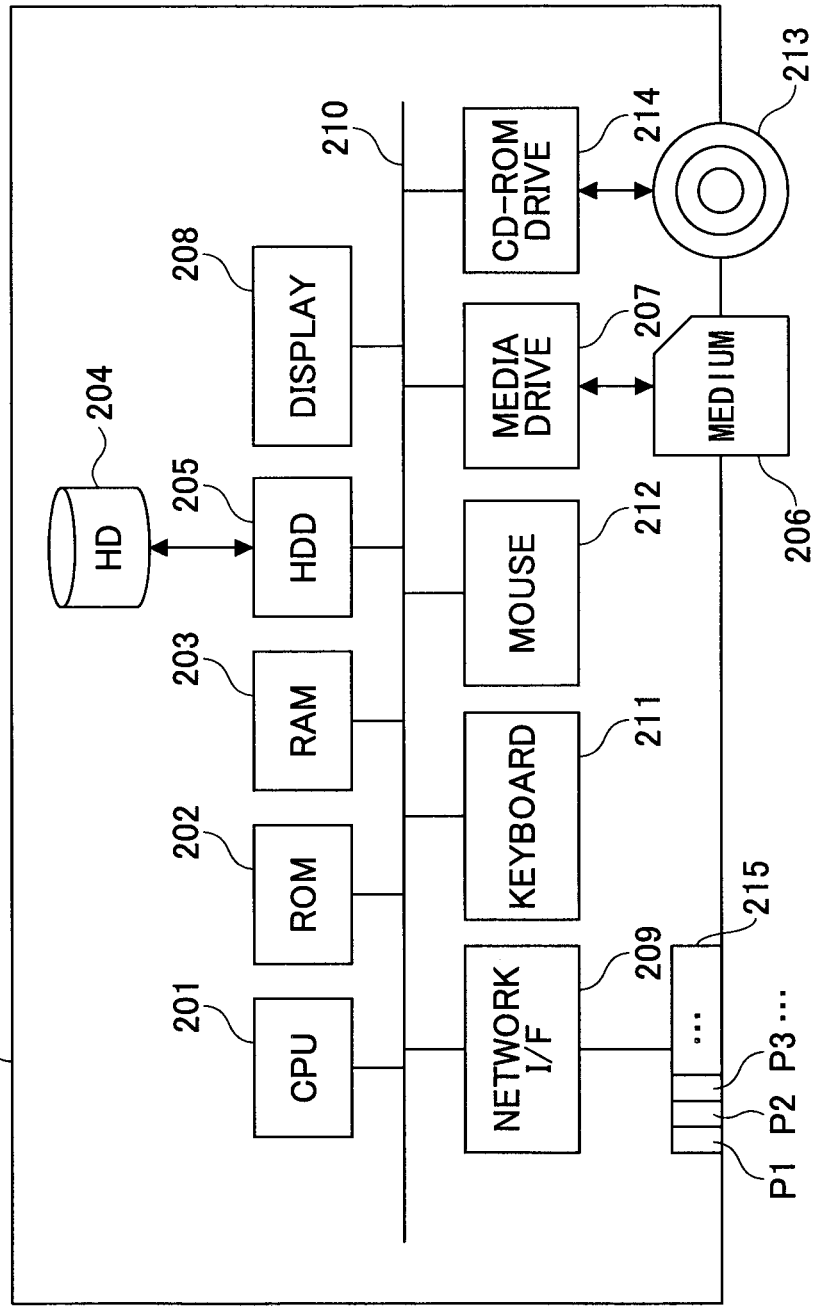
FIG. 4 shows a hardware configuration common to a transmission management system, a relay apparatus, a program providing system and a maintenance system according to the embodiment.

FIG. 4 shows a hardware configuration of the management system 50 according to the embodiment. The management system 50 includes a CPU 201 controlling operations of the entirety of the management system 50; a ROM 202 storing a program for transmission management; a RAM 203 used as a work area of the CPU 201; a HD (hard disk) 204 storing various data; a HDD (Hard Disk Drive) 205 controlling reading and writing of the various data from and to the HD 204 according to the control of the CPU 201; a media drive 207 controlling reading and writing (recording) of data from and to a recording medium 206 such as a flash memory; and a display device 208 displaying various sorts of information such as a cursor, a menu, a window (screen page), characters/letters (text) or an image. The management system 50 further includes a network I/F 209 for carrying out data transmission using the communication network 2 described later; a keyboard 211 including plural keys for the user to input characters/letters, numerical values, various instructions and so forth; a mouse 212 for the user to select or execute various instructions, select a target to process, move the cursor or so; a CD-ROM drive 214 controlling reading various data from a CD-ROM (Compact Disc Read Only Memory) 213 as an example of a detachable recording medium; and bus lines 210 such as an address bus, a data bus and so forth electrically connecting the above-mentioned respective elements/components together as shown in FIG. 4. The reference numeral "215" denotes "ports" (P1, P2, P3, . . . ) which will be described later in the description of the relay apparatuses 30.

It is noted that the program for transmission management may be recorded in a computer readable information recording medium such as the above-mentioned recording medium 206, CD-ROM 213 or such in a form of a file of an installable type or an executable type, and be circulated.

Further, the relay apparatus 30 has the same hardware configuration as that of the management system 50, and therefore, the description thereof will be omitted. However, in the ROM 202 of the relay apparatus 30, a program for the relay apparatuses 30 for controlling the relay apparatuses 30 is recorded. Also in this case, the program for the relay apparatuses 30 may be recorded in a computer readable information recording medium such as the recording medium 206, the CD-ROM 213 or such in a form of a file of an installable type or an executable type, and be circulated. Further, as mentioned above, at least the relay apparatus 30 has the ports 215 (P1, P2, P3, . . . ) (configured as hardware or software) used in communication with terminals 10 and the ports 215 may be actually included in the network I/F 209.

Further, the program providing system 90 has the same hardware configuration as that of the management system 50, and therefore, the description thereof will be omitted. However, in the ROM 202 of the program providing system 90, a program for providing programs for controlling the program providing system 90 is recorded. Also in this case, the program for providing programs may be recorded in a computer readable information recording medium such as the recording medium 206, the CD-ROM 213 or such in a form of a file of an installable type or an executable type, and be circulated.

Further, the maintenance system 100 has the same hardware configuration as that of the management system 50, and therefore, the description thereof will be omitted. However, in the ROM 202 of the maintenance system 100, a program for maintenance for controlling the maintenance system 100 is recorded. Also in this case, the program for maintenance may be recorded in a computer readable information recording medium such as the recording medium 206, the CD-ROM 213 or such in a form of a file of an installable type or an executable type, and be circulated.

It is noted that each of the above-mentioned programs may be recorded in a computer readable information recording medium such as a CD-R (Compact Disc Recordable), a DVD (Digital Versatile Disk) or a Blu-ray Disc, as other examples of the above-mentioned detachable recording medium, and be provided.

Functional Configuration of Embodiment

Figure 5:
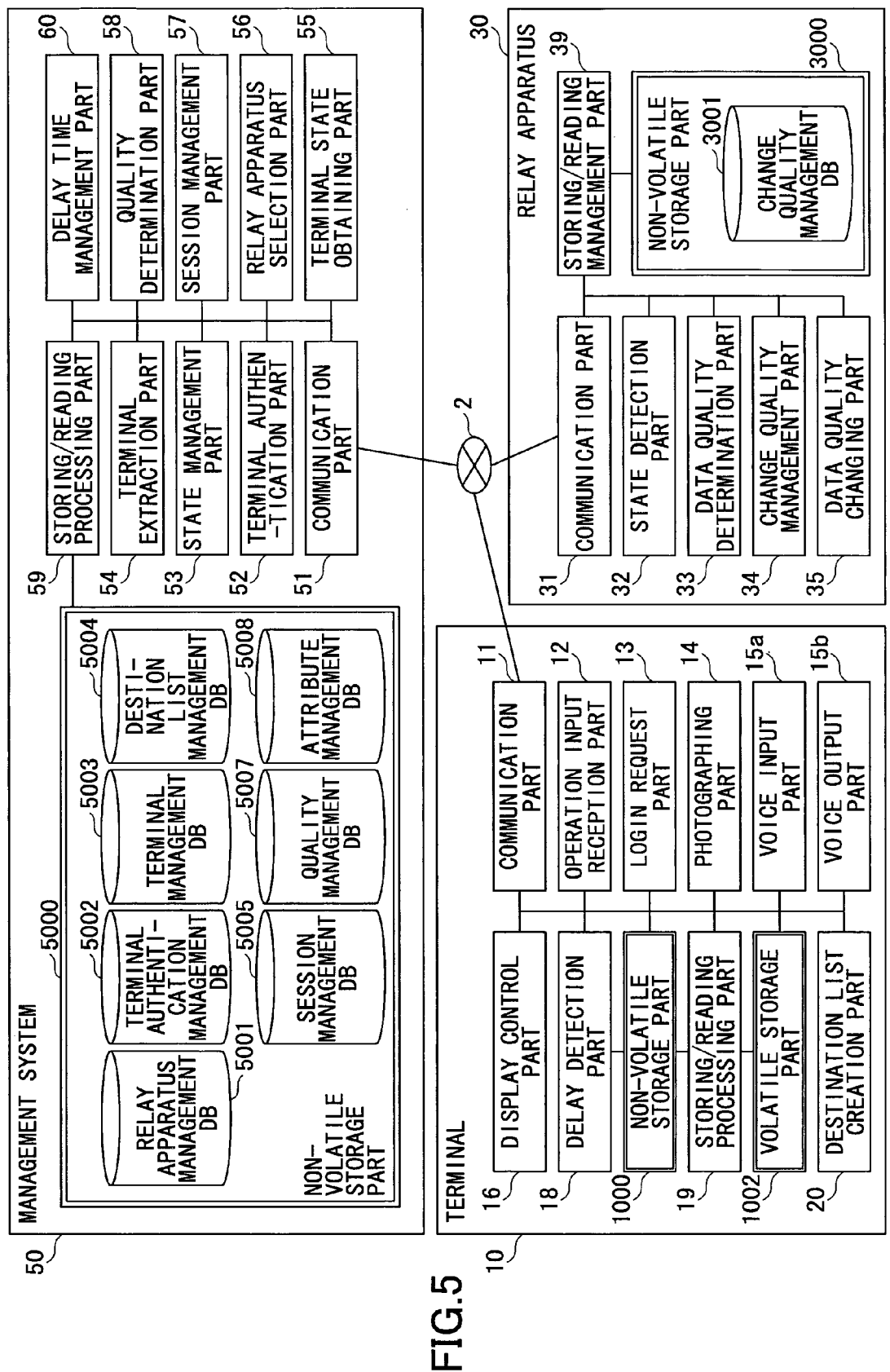
FIG. 5 is a functional block diagram common to the terminal, the apparatus and the system included in the transmission system according to the embodiment.

Next, a functional configuration of the embodiment will be described. FIG. 5 shows a functional block diagram of the terminal 10, the relay apparatus 30 and the management system 50 included in the transmission system 1 according to the embodiment. In FIG. 5, the terminal 10, the relay apparatus 30 and the management system 50 are connected together by the communication network 2 in such a manner that data transmission can be mutually carried out. Further, the program providing system 90 and the maintenance system 100 shown in FIGS. 1A and 1B are omitted in FIG.

5 because the program providing system 90 and the maintenance system 100 do not directly relate to communication for a TV conference.

<Functional Configuration of Terminal>

The terminal 10 includes a communication part 11, an operation input reception part 12, a login request part 13, a photographing part 14, a voice input part 15a, a voice output part 15b, a display control part 16, a delay detection part 18, a storing/reading processing part 19 and a destination list creation part 20. The parts correspond to functions or functioning parts realized as a result of the respective elements/components shown in FIG. 3 operating according to instructions given by the CPU 101 that operates according to the program stored in the ROM 102. Further, the terminal 10 has a non-volatile storage part 1000 provided by the flash memory 104 shown in FIG. 3 and a volatile storage part 1002 provided by the RAM 103 shown in FIG. 3.

(Detailed Functional Configuration of Terminal)

Next, the respective parts of the terminal 10 will be described in detail. The communication part 11 of the terminal 10 is realized by the network I/F 111 shown in FIG. 3, and carries out transmission and reception of various sorts of data (or information) with another terminal 10, apparatus 30 or system via the communication network 2. The communication part 11 starts reception of respective state information indicating states of respective terminals 10 as candidates for a destination from the management system 50 before starting a telephone call with a terminal 10 (destination terminal) as a desired destination. It is noted that the state information indicates not only an operating state (on-line or off-line) of each terminal 10 but also a detailed state of whether on telephone call (i.e., during a telephone call) further when on-line, or so. Further, the state information indicates various states including not only the operating state of each terminal 10 but also whether the cable (120c) has been removed from the terminal 10, whether the terminal 10 has been set to output voice but not output an image, or set to output no voice (MUTE), or so. Below, a case is supposed that, as one example, the state information indicates an operating state of the terminal 10.

The operation input reception part 12 is realized by the operating buttons 108 and the power supply switch 109, and receives various sorts of input operations carried out by the user. For example, when the user turns on the power supply switch 109, the operation input reception part 12 shown in FIG. 5 turns on the power supply in the terminal 10 by receiving the user's operation of turning on the power supply switch 109. The login request part 13 is realized by instructions from the CPU 101 shown in FIG. 3, and automatically transmits login request information indicating to request login and an IP address (at the current time) of the terminal 10 (request source terminal) as a request source to the management system 50 via the communication network 2 from the communication part 11 in response to receiving the user's operation of turning on the power supply switch 109. Further, when the user turns off the power supply switch 109, the communication part 11 transmits state information to turn off the power supply to the management system 50, and after that, the operation input reception part 12 completely turns off the power supply in the terminal 10. Thus, the management system 50 can determine that the terminal 10 is changing its state from the power turned on (power supply ON) to the power turned off (power supply OFF).

The photographing part 14 is realized by instructions from the CPU 101, and the camera 112 and the image sensor I/F 113 shown in FIG. 3, and photographs an object and outputs image data thus obtained from the photographing. The voice input part 15a is realized by the voice input/output I/F 116 shown in FIG. 3, and inputs voice data expressed by a voice signal when a voice of the user is converted into the voice signal by the microphone 114. The voice output part 15b is realized by instructions from the CPU 101 and the voice input/output I/F 116, and outputs a voice signal expressing voice data to the speaker 115 and causes the speaker 115 to output voice sound.

The display control part 16 is realized by the display I/F 117 shown in FIG. 3, and carries out control to transmit image data to the display device 120 provided in the outside. Further, the display control part 16 displays a destination list, including respective destination names based on the state information received by the communication part 11, on the display device 120, before a request source terminal starts a telephone call of a TV conference with a desired destination terminal.

For example, on the display device 120, by the display control part 16, a destination list frame 311-1 such as that shown in FIG. 21 is displayed. In the destination list frame 311-1, respective destination names such as "A company Tokyo office AB terminal" 311-2 and so forth are displayed, and icons (311-3a, 311-3b, 311-3c) indicating states of the state information for the respective destination names are displayed. Thereamong, the icon 311-3a indicates that since one terminal 10 as a destination candidate is waiting in an on-line state, it is possible to carry out a telephone call with the terminal. The icon 311-3b indicates that since one terminal 10 as a destination candidate is in an off-line state, it is not possible to carry out a telephone call with the terminal. The icon 311-3c indicates that since one terminal 10 as a destination candidate is carrying out a telephone call with another terminal (i.e., "on telephone call"), it is possible to participate in the telephone call. Further, in the destination list frame 311-1, a scroll bar 311-4 is displayed at a right end, where when a triangular upward or downward icon is selected by the user, destination names as destination candidates and icons indicating the corresponding states, not displayed in FIG. 21, will be then displayed.

The delay detection part 18 is realized by instructions given by the CPU 101, and detects a delay time (ms) of image data or voice data sent from another terminal 10 via a relay apparatus 30.

Further, the storing/reading processing part 19 is realized by instructions from the CPU 101 and, for example, by the SSD 105 shown in FIG. 3, stores various sorts of data in the non-volatile storage part 1000, and reads various sorts of data stored in the non-volatile storage part 1000. In the non-volatile storage part 1000, terminal IDs (identifications) for identifying the terminals 10, respectively, passwords and so forth, are stored. Further, the storing/reading processing part 19 also stores various sorts of data in the volatile storage part 1002, and reads various sorts of data stored in the volatile storage part 1002. In the volatile storage part 1002, image data and voice data received when a telephone call is carried out with a destination terminal 10 are stored in an overwriting manner each time of receiving. There, an image is displayed on the display device 120 from the image data before being overwritten, and voice audio is output from the speaker 115 from the voice data before being overwritten.

The destination list creation part 20 creates and updates the destination list where, as shown in FIG. 21, the states of destination candidates are indicated by the icons, as mentioned above, based on destination list information (described later) and state information of terminals 10 as destination candidates received from the management system 50.

It is noted that the terminal IDs and relay apparatus IDs described later according to the embodiment indicate identification information such as a language, a character/letter, a sign or various sorts of marks used for uniquely identifying the respective terminals 10 and relay apparatuses 30. Further, each of the terminal IDs and the relay apparatus IDs may be identification information that is a combination of at least two of the above-mentioned language, character/letter, sign and various sorts of marks.

<Functional Configuration of Relay Apparatus>

Next, functions or parts of the relay apparatus 30 will be described. The relay apparatus 30 includes, as shown in FIG. 5, a communication part 31, a state detection part 32, a data quality determination part 33, a change quality management part 34, a data quality changing part 35 and a storing/reading processing part 39. These parts correspond to functions or functioning parts realized as a result of the respective elements/components shown in FIG. 4 operating according to instructions given by the CPU 201 that operates according to the program stored in the ROM 202. Further, the relay apparatus 30 has a non-volatile storage part 3000 provided in the HD 204 shown in FIG. 4, where even when the power supply in the relay apparatus 30 is turned off, various sorts of data and/or information stored therein are maintained.

(Change Quality Management Table)

In the non-volatile storage part 3000, a change quality management DB (DataBase) 3001 including a change quality management table such as that shown in FIG. 7 is provided. FIG. 7 shows a concept of the change quality management table. In the change quality management table, the IP address of a terminal 10 as a relay destination of image data and image quality of the image of the image data relayed by the relay apparatus 30 to the relay destination are associated with one another and are managed.

Resolution of image data used in the embodiment will now be described with reference to FIGS. 8A, 8B and 8C which are conceptual diagrams illustrating image quality (quality of the image) of image data. As shown in FIG. 8A, an image of low resolution as a base image has a configuration of 160 pixels (in a horizontal direction) by 120 pixels (in a vertical direction). As shown in FIG. 8B, an image of medium resolution has a configuration of 320 pixels (in the horizontal direction) by 240 pixels (in the vertical direction). As shown in FIG. 8C, an image of high resolution has a configuration of 640 pixels (in the horizontal direction) by 480 pixels (in the vertical direction). In a case where a narrow band path is used, image data of low image quality including only image data of low resolution as a base image is relayed. In a case where a band is relatively wide, image data of medium image quality including image data of low resolution as a base image and image data of medium resolution are relayed. In a case where a band is very wide, image data of high image quality including image data of low resolution as a base image, image data of medium resolution and image data of high resolution are relayed. For example, in the change quality management table shown in FIG. 7, in a case where a relay apparatus 30 relays image data to a destination terminal (terminal 10*db*) of the IP address "1.3.2.4", the image quality (quality of the image) of image data being relayed is "high quality" ("high image quality").

(Detailed Functional Configuration of Relay Apparatus)

Next, the functional configuration of each of the parts of the relay apparatus 30 will be described in detail. It is noted that below, along with describing the functional configuration of each of the parts of the relay apparatus 30, relationships with main elements/components, from among those shown in FIG. 4, used for realizing the functional configuration of each of the parts of the relay apparatus 30 will be also described.

The communication part 31 of the relay apparatus 30 shown in FIG. 5 is realized by the network I/F 209 shown in FIG. 4, and carries out transmission and reception of various sorts of data (information) with a terminal 10, another apparatus or a system via the communication network 2. The state detection part 32 is realized by instructions from the CPU 201 shown in FIG. 4, and detects the operating state of the relay apparatus 30 (own apparatus) having this state detection part 32. The operating state may be a state of "on-line", "off-line" or "in failure".

The data quality determination part 33 is realized by instructions from the CPU 201 shown in FIG. 4, searches the change quality management table (see FIG. 7) of the change quality management DB 3001 using the IP address of a destination terminal as a search key, extracts the image quality of the corresponding image data to be relayed, and thus determines the current image quality of the image data to be relayed. The change quality management part 34 is realized by instructions from the CPU 201, and changes the contents of the change quality management table based on quality information (described later) which is sent from the management system 50. For example, a case is supposed where a TV conference is being conducted between a request source terminal (terminal 10*aa*) having the terminal ID "01aa" and a destination terminal (terminal 10*db*) having the terminal ID "01db" where image data of high image quality is mutually transmitted, and a delay in receiving the image data occurs in the destination terminal (terminal 10*db*) because another request source terminal (terminal 10*bb*) and another destination terminal (10*ca*) have started another TV conference using the communication network 2, or so. In such a case, the relay apparatus 30 needs to reduce the image quality of the image data, having been relayed by the relay apparatus 30 until now, from the high image quality to the medium image quality. In such a case, based on the quality information indicating this medium image quality, the contents of the change quality management table are changed so that the image quality of the image data which the relay apparatus 30 is relaying is reduced from the high image quality to the medium image quality.

The data quality changing part 35 is realized by instructions from the CPU 201, and changes the image quality of the image data sent from the transmission source terminal 10 based on the contents of the change quality management table of the change quality management DB 3001 changed as mentioned above. The storing/reading processing part 39 is realized by the HDD 205 shown in FIG. 4, and carries out processing of recording various sorts of data in the non-volatile storage part 3000 and reading various sorts of data stored in the non-volatile storage part 3000.

<Functional Configuration of Management system>

Next, functions or parts of the management system 50 will be described. The management system 50 includes, as shown in FIG. 5, a communication part 51, a terminal authentication part 52, a state management part 53, a terminal extraction part 54, a terminal state obtaining part 55, a relay apparatus selection part 56, a session management part 57, a quality management part 58, a storing/reading processing part 59 and a delay time management part 60. These respective parts correspond to functions or functioning parts realized as a result of the respective elements/ components shown in FIG. 4 operating according to instructions given by the CPU 201 that operates according to the program stored in the ROM 202. Further, the management system 50 has a non-volatile storage part 5000 realized by the HD 204 shown in FIG. 4 where various sorts of data (or information) are maintained even after the power supply in the management system 50 is turned off. In the non-volatile storage part 5000, data of the destination list frame 311-1 shown in FIG. 21 is stored.

(Relay Apparatus Management Table)

In the non-volatile storage part 5000, further, a relay apparatus management DB 5001 including a relay apparatus management table such as that shown in FIG. 9 is provided. It is noted that FIG. 9 shows a concept of the relay apparatus management table. In the relay apparatus management table, for each of respective relay apparatus IDs of the respective relay apparatuses 30, the operating state of each of the relay apparatuses 30, the number of ports used and the number of ports (215, P1, P2, P3, ..., see FIG. 4) usable in each of the relay apparatuses 30, reception date and time when the state information indicating the operating state of each of the relay apparatuses 30 has been received by the management system 50, the IP address of each of the relay apparatuses 30, and the maximum data transmission rate (Mbps) at each of the relay apparatus 30, are associated and managed. For example, in the relay apparatus management table shown in FIG. 9, for the relay apparatus 30a having the relay apparatus ID "111a", it is indicated that the operating state is "on-line"; the number of ports used is "10"; the number of ports usable is "100"; the date and time when the state information has been received in the management system 50 are "Nov. 10, 2009, 13:00"; the IP address of the relay apparatus 30a is "1.2.1.2"; and the maximum transmission rate at the relay apparatus 30a is 100 Mbps.

(Terminal Authentication Management Table)

Further, in the non-volatile storage part 5000, a terminal authentication management DB 5001 including a terminal authentication management table such as that shown in FIG. 10 is provided. FIG. 10 shows a concept of the terminal authentication management table. In the terminal authentication management table, respective passwords are associated with the terminal IDs of all the terminals 10 managed by the management system 50 and are managed. For example, in the terminal authentication management table shown in FIG. 10, it is indicated that the terminal ID of the terminal 10aa is "01aa", and the password thereof is "aaaa".

(Terminal Management Table)

Further, in the non-volatile storage part 5000, a terminal management DB 5003 including a terminal management table such as that shown in FIG. 11 is stored. FIG. 11 shows a concept of the terminal management table. In the terminal management table, for the terminal ID of each of the terminals 10, a destination name (i.e., terminal name) for a case where the terminal 10 acts as a destination, the operating state of the terminal 10, the reception date and time when login request information (described later) has been received by the management system 50, and the IP address of the terminal 10 are associated and are managed. For example, in the terminal management table shown in FIG. 11, it is indicated that the terminal 10aa having the terminal ID "01aa" has the destination name "Japan Tokyo office AA terminal", the operating state "on-line", the reception date and time when the login request information has been received in the management system 50 is "Nov. 10, 2009, 13:40", and the IP address of the terminal 10aa is "1.2.1.3".

(Destination List Management Table)

Further, in the non-volatile storage part 5000, a destination list management DB 5004 including a destination list management table such as that shown in FIG. 12 is stored. FIG. 12 shows a concept of the destination list management table. In the destination list management table, for the terminal ID of a request source terminal which requests to start a telephone call in a TV conference, all of the terminal IDs of the destination terminals registered as candidates for a destination terminal are associated and are managed. For example, in the destination list management table shown in FIG. 12, it is indicated that the candidates for a destination terminal for which the request source terminal (terminal 10aa) having the terminal ID "01aa" can request to start a telephone call in a TV conference are the terminal 10ab having the terminal ID "01ab, the terminal 10ba having the terminal ID "01ba", the terminal 10bb having the terminal ID "01bb" and so forth. The candidates for a destination terminal are updated as a result of addition or deletion according to a request of addition or deletion from the request source terminal to the management system 50.

(Session Management Table)

Further, in the non-volatile storage part 5000, a session management DB 5005 including a session management table such as that shown in FIG. 13 is provided. FIG. 13 shows a concept of the session management table. In the session management table, for each of session IDs used for identifying sessions in which content data is communicated between terminals 10, the relay apparatus ID of the relay apparatus 30 used for relaying image data and voice data, the terminal ID of the request source terminal, the terminal ID of the destination terminal, a delay time (ms) of reception when image data is received in the destination terminal, and the reception date and time when delay information indicating the delay time has been sent from the destination terminal and received in the management system 50 are associated and managed. For example, in the session management table shown in FIG. 13, it is indicated that the relay apparatus 30a (the relay apparatus ID "111a") selected in the session executed using the selection session ID "se1" is relaying image data and voice data between the request source terminal (terminal 10aa) of the terminal ID "01aa", and the destination terminal (terminal 10bb) of the terminal ID "01bb", the destination terminal (terminal 10cb) of the terminal ID "01cb" and the destination terminal (terminal 10db) of the terminal ID "01db", and the delay time of the image data is 200 (ms) at the time of "Nov. 10, 2009, 14:00". It is noted that in a case where a TV conference is carried out between two terminals 10, the reception date and time of the delay information may be managed based on the delay information sent from the request source terminal instead of the destination terminal. However, in a case where a TV conference is conducted between three or more terminals 10, the reception date and time of the delay information is managed based on the delay information sent from the terminal which is receiving the image data and the voice data.

(Quality Management Table)

Further, in the non-volatile storage part 5000, a quality management DB 5007 including a quality management table such as that shown in FIG. 14 is stored. FIG. 14 shows a concept of the quality management table. In the quality management table, the delay time of image data and image quality (quality of the image) of the image data are associated with one another and are managed in such a manner that as the delay time (ms) of image data at a request source terminal or a destination terminal is longer, the image quality of the image data relayed by the relay apparatus 30 is to be reduced. It is noted that in a case where the delay time is more than "500 ms", the communication is to be interrupted ("INTERRUPTION") since the delay is too much.

(Attribute Management Table)

Further, in the non-volatile storage part 5000, an attribute management DB 5008 including an attribute management table such as that shown in FIG. 15 is stored. FIG. 15 shows a concept of the attribute management table. In the attribute management table, first attribute information indicating a first attribute of the terminal 10 and second attribute information indicating a second attribute of the terminal 10 are associate with each of the terminal IDs of all the terminals managed by the management system 50, and are managed. Here, the first attribute information indicates the first attribute which is an attribute concerning a certain communication network (intranet, i.e., a part of the communication network 2) with which the terminal 10 is connected. More specifically, the first attribute is the relay apparatus ID (hereinafter, referred to as "intranet relay apparatus ID") for identifying the relay apparatus 30 connected to the certain communication network. The second attribute information indicates the second attribute which indicates an attribute concerning a certain area where the terminal 10 is connected to the communication network 2. More specifically, the second attribute is the relay apparatus ID (hereinafter, referred to as "segment relay apparatus ID") for identifying the relay apparatus 30 connected to the communication network 2 from the certain area. That is, in the attribute management table shown in FIG. 15, for each of the terminals 10, the relay apparatus ID of the relay apparatus 30 which is to be assigned preferentially for relaying image data and voice data is associated and managed.

(Detailed Functional Configuration of Management System)

Next, the functional configuration of each of the parts included in the management system 50 will be described in detail. It is noted that below along with describing the respective functional configurations of the parts of the management system 50, relationships with main elements/components, from among those shown in FIG. 4, used for realizing the respective functional configurations of the parts of the management system 50 will be also described.

The communication part 51 is realized by the network I/F 209 shown in FIG. 4, and carries out transmission and reception of various sorts of data (information) with a terminal 10, a relay apparatus 30 or another system via the communication network 2. The terminal authentication part 52 searches the terminal authentication management table (see FIG. 10) in the non-volatile storage part 5000 using the terminal ID and the password included in login request information received via the communication part 51 as search keys, and carries out authentication of the terminal 10 by determining whether the same terminal ID and password are managed in the terminal authentication management table.

For the purpose of managing the operating state of a request source terminal which has requested to login, the state management part 53 stores the terminal ID of the request source terminal, the operating state of the request source terminal, the reception date and time when the login request information has been received in the management system 50 and the IP address of the request source terminal in the terminal management table (see FIG. 11) in a manner of associating them with each other and manages them. Further, the terminal management part 53 changes the corresponding operating state indicating on-line in the terminal management table (see FIG. 11) into off-line based on state information indicating that power supply will be turned off sent from a terminal 10 in response to the user of the terminal 10 turning off the power supply switch 109 of the terminal 10.

The terminal extraction part 54 searches the destination list management table of the destination list management DB 5004 (see FIG. 12) using the terminal ID of a request source terminal which has requested to login as a search key, reads the terminal IDs as candidates for a destination terminal which can carry out a telephone call with the request source terminal, and extracts the terminal IDs. Further, the terminal extraction part 54 searches the destination list management DB 5004 (see FIG. 12) using the terminal ID of a request source terminal which has requested to login as a search key, and extracts also the terminal IDs of the other request source terminals which have registered the terminal ID of the request source terminal as a candidate for a destination terminal.

The terminal state obtaining part 55 searches the terminal management table of the terminal management DB 5003 (see FIG. 11) using the terminal IDs of candidates for a destination terminal extracted by the terminal extraction part 54 as search keys, and reads the operating state for each of the terminal IDs extracted by the terminal extraction part 54. Thereby, the terminal state obtaining part 55 can obtain the operating states of the candidates for a destination terminal which can carry out a telephone call with the request source terminal having requested to login. Further, the terminal state obtaining part 55 searches the terminal management table using the terminal ID of the request source terminal having requested to login, and obtains the operating state of the request source terminal having requested to login.

Figure 6:
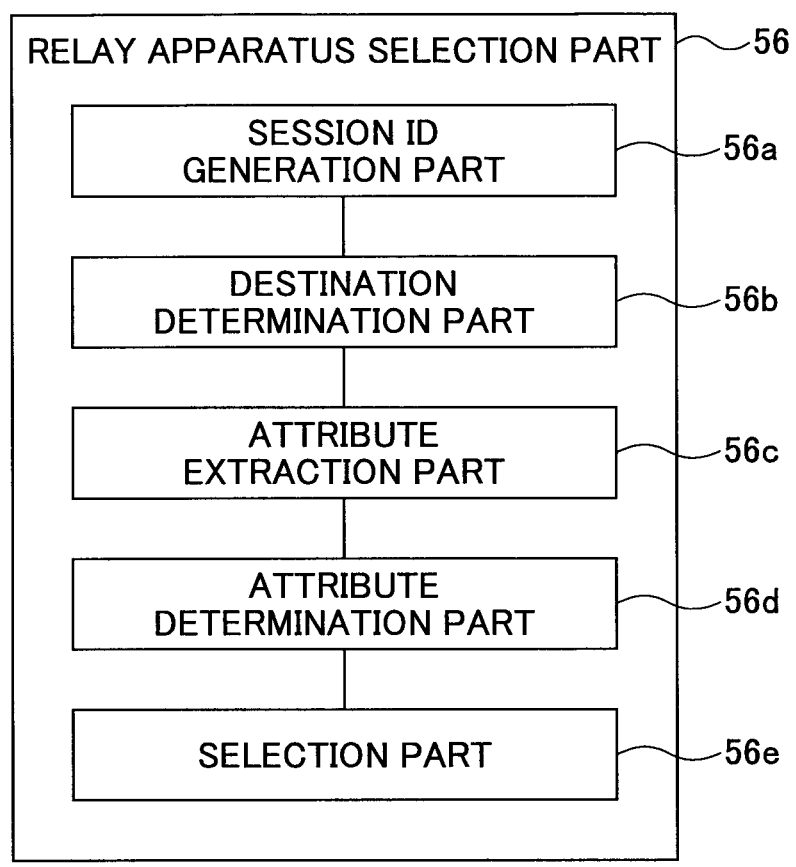
FIG. 6 is a functional block diagram showing details of a relay apparatus selection part 56 shown in FIG. 5.
Figure 8:
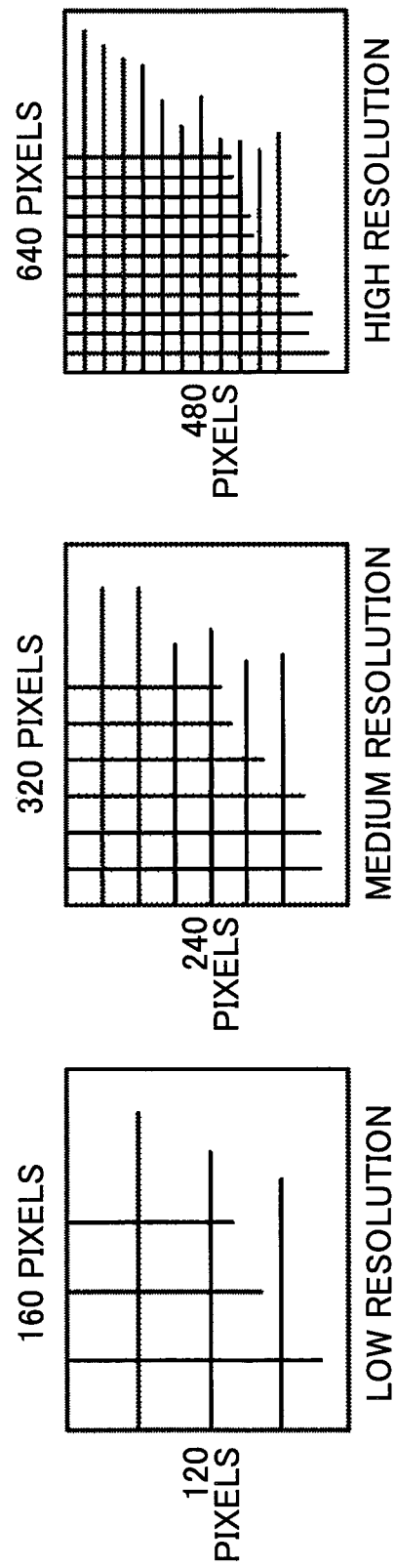
FIG. 8A illustrates a concept of image quality of image data (low resolution)
FIG. 8B illustrates a concept of image quality of image data (medium resolution)
FIG. 8C illustrates a concept of image quality of image data (high resolution)

The relay apparatus selection part 56 selects a relay apparatus 30 used for relaying image data and voice data for each of sessions in which content data is communicated between terminals 10. For this purpose, the relay apparatus selection part 56 realizes, according to instructions given by the CPU 201 shown in FIG. 4, a session ID generation part 56*a*, a destination determination part 56*b*, an attribute extraction part 56*c*, an attribute determination part 56*d* and a selection part 56*e* shown in FIG. 6. It is noted that FIG. 6 is a functional block diagram showing details of the relay apparatus selection part 56 shown in FIG. 5.

Thereamong, the session ID generation part 56*a* generates a session ID for identifying a session in which content data is communicated between terminals 10. The destination determination part 56*b* determines whether the terminal ID of a request source terminal of a TV conference is the same as the terminal ID of a destination terminal which is a request target. The attribute extraction part 56*c* searches the attribute management table of the attribute management DB 5008 (see FIG. 15) based on the terminal IDs of the request source terminal and the destination terminal, and extracts the corresponding attributes. The attribute determination part 56*d* determines whether the attributes of the respective terminals 10 extracted by the attribute extraction part 56*c* are the same. The selection part 56*e* selects a relay apparatus 30 based on the attributes extracted by the attribute extraction part 56*c*.

The session management part 57 stores the session ID generated by the session ID generation part 56*a*, the terminal ID of the request source terminal and the terminal ID of the destination terminal in a manner of associating them with each other in the session management table of the session management DB 5005 (see FIG. 13) of the non-volatile storage part 5000, and manages them. Further, the session management part 57 stores for each of the session IDs, the relay apparatus ID of the relay apparatus 30 selected by the selection part 56e in the session management DB 5005 (see FIG. 13) and manages them.

The quality determination part 58 searches the quality management table of the quality management DB 5007 (see FIG. 14) using the above-mentioned delay time as a search key, extracts the image quality of the corresponding image data, and determines the image quality of the image data to be relayed by the relay apparatus 30. The storing/reading processing part 59 is realized by the HDD 205 shown in FIG. 4, stores various sorts of data in the non-volatile storage part 5000 and reads various sorts of data stored in the non-volatile storage part 5000. The delay time management part 60 searches the terminal management table (see FIG. 11) using the IP address of the above-mentioned destination terminal, extracts the corresponding terminal ID, and further stores the delay time indicated by the above-mentioned delay information at the field of delay time on the record including the thus-extracted terminal ID in the session management table of the session management DB 5005 (see FIG. 13), and manages it.

Processing/Operations of Embodiment

Figure 16:
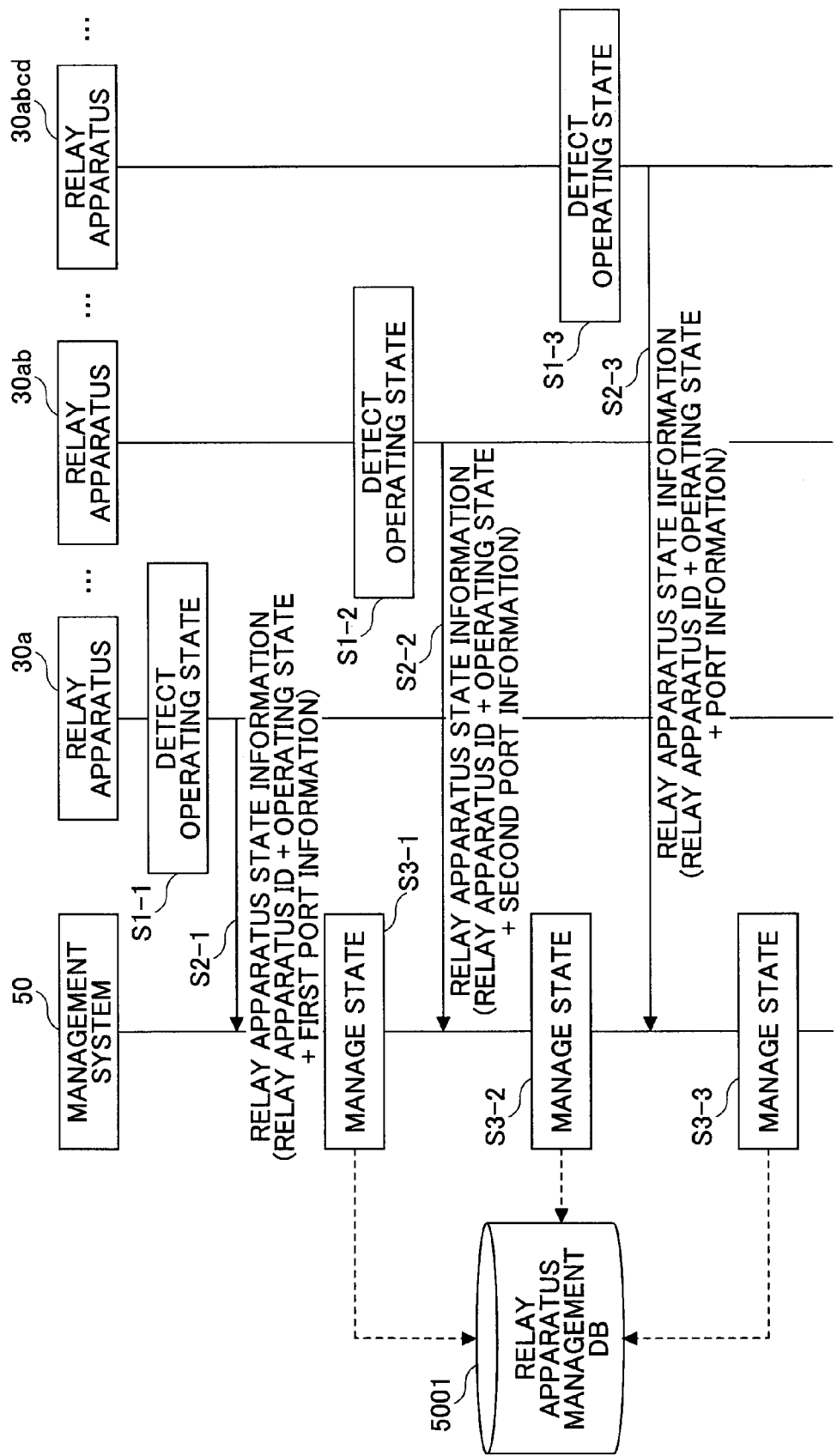
FIG. 16 is a sequence diagram showing a process of managing state information indicating an operating state of each relay apparatus.
Figure 17:
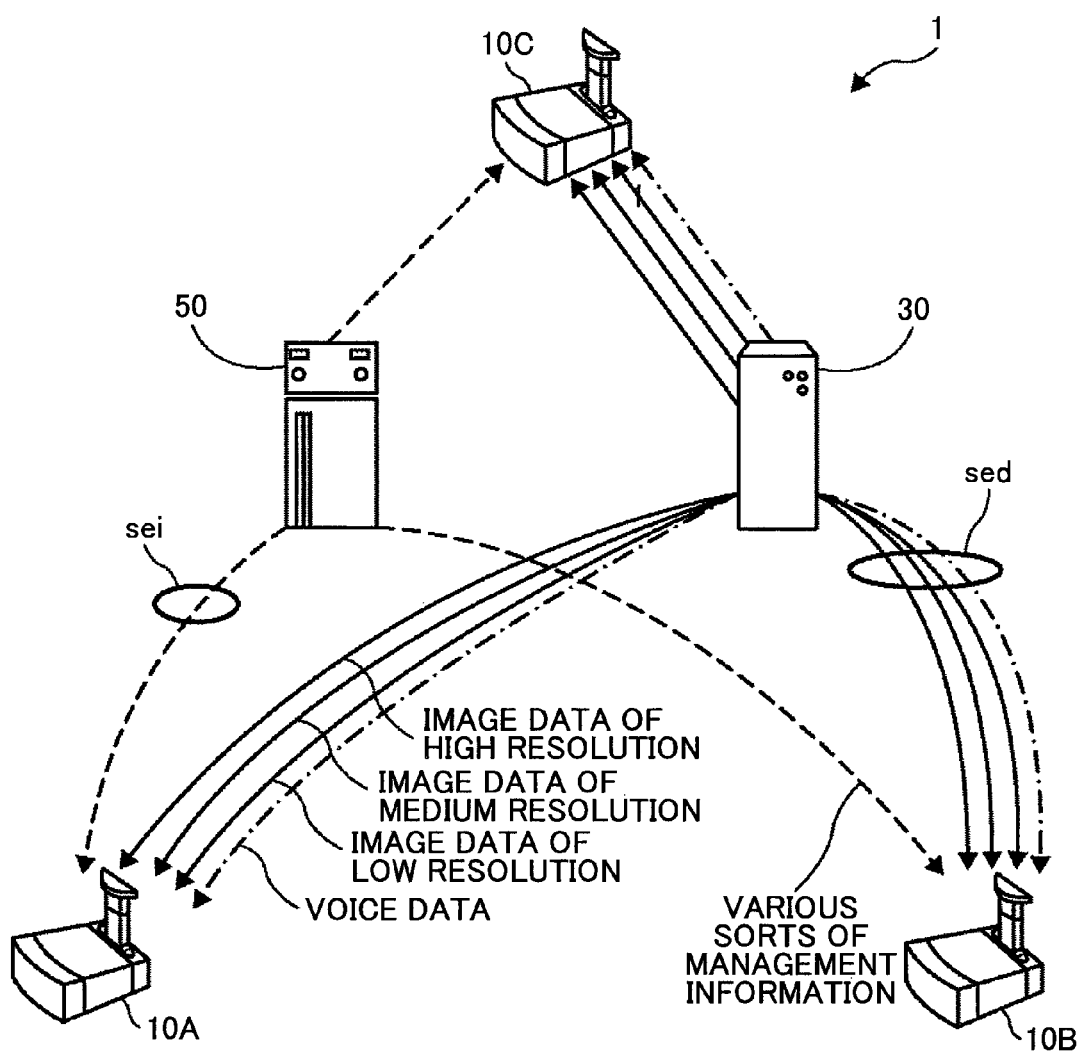
FIG. 17 is a general view showing a state where image data, voice data and various sorts of management information are transmitted in the transmission system.
Figure 18:
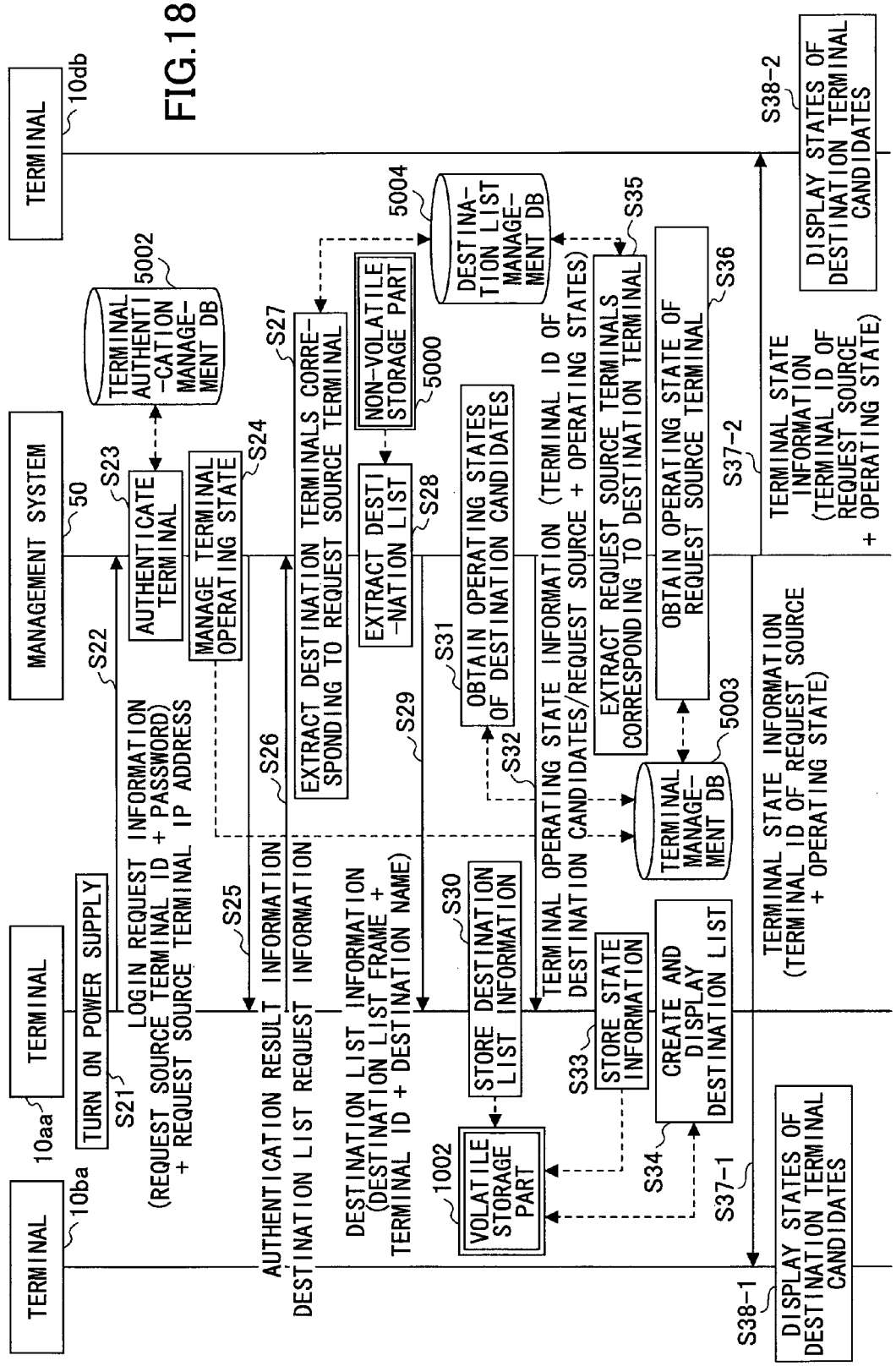
FIG. 18 is a sequence diagram showing a process in a preparation step for starting a telephone call between transmission terminals.
Figure 19:
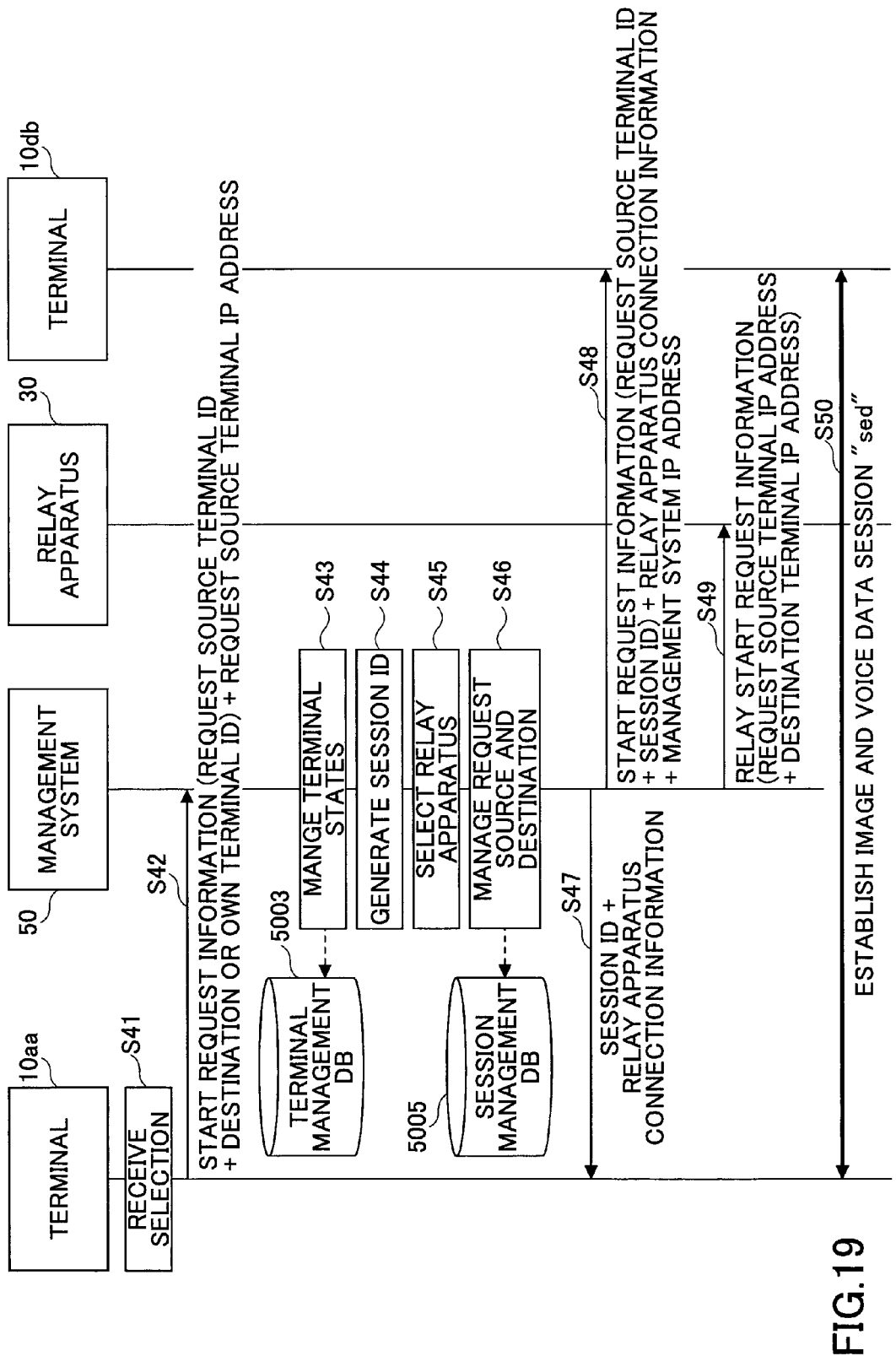
FIG. 19 is a sequence diagram showing a process of selecting a relay apparatus.
Figure 20:
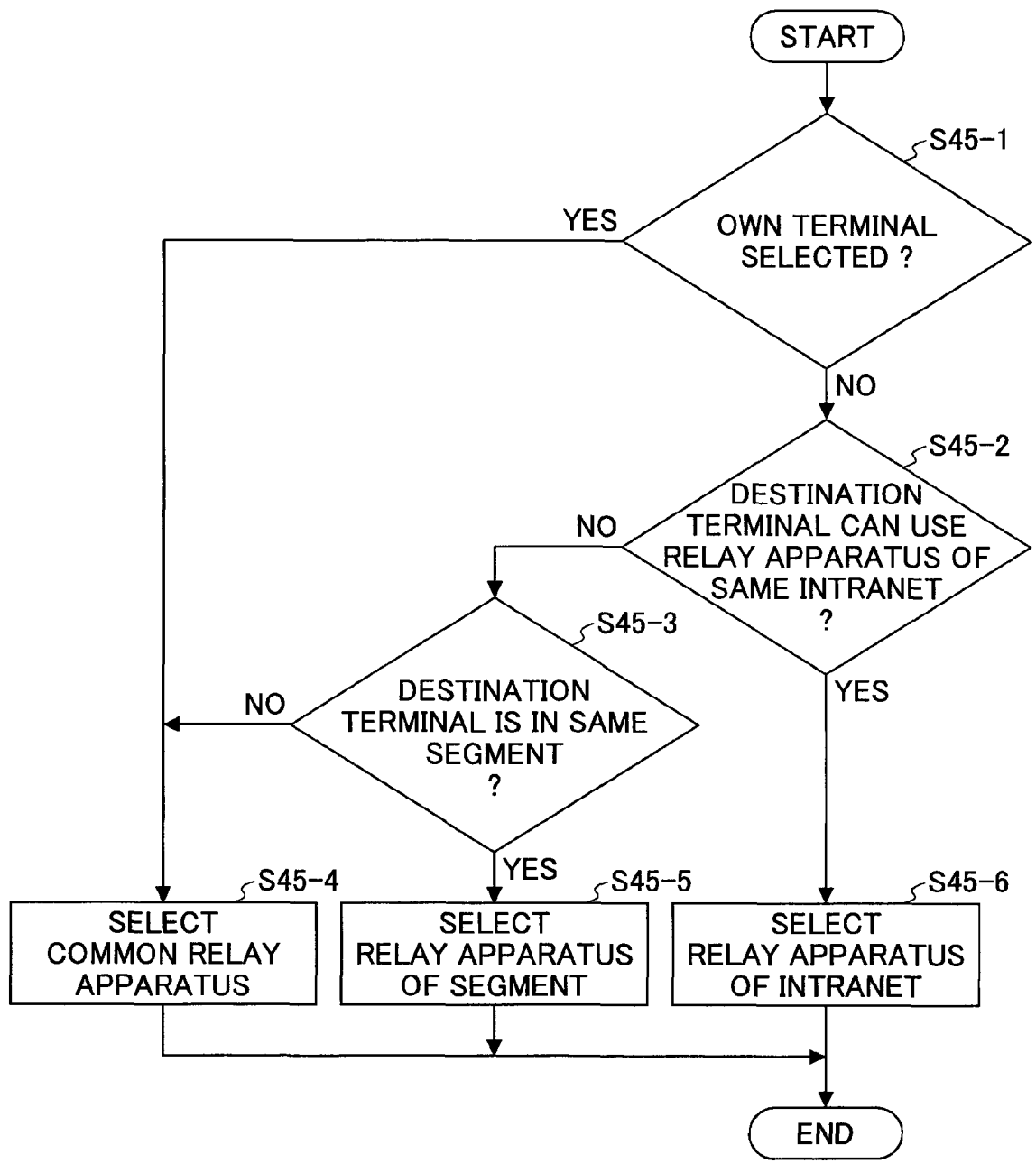
FIG. 20 is a flowchart showing a process of selecting a relay apparatus.
Figure 22:
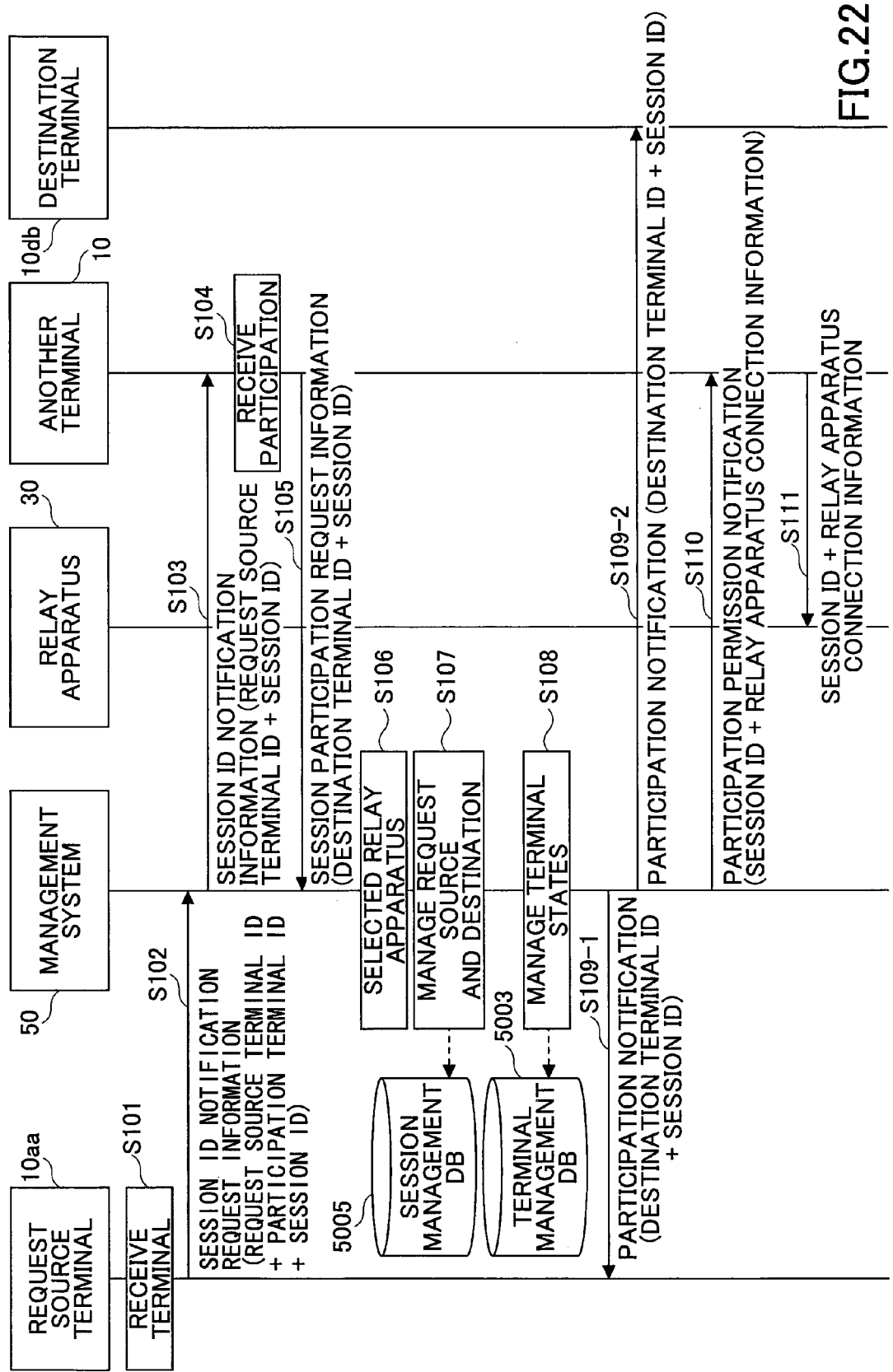
FIG. 22 is a sequence diagram showing a process of requesting participation in an image and voice data session.
Figure 23:
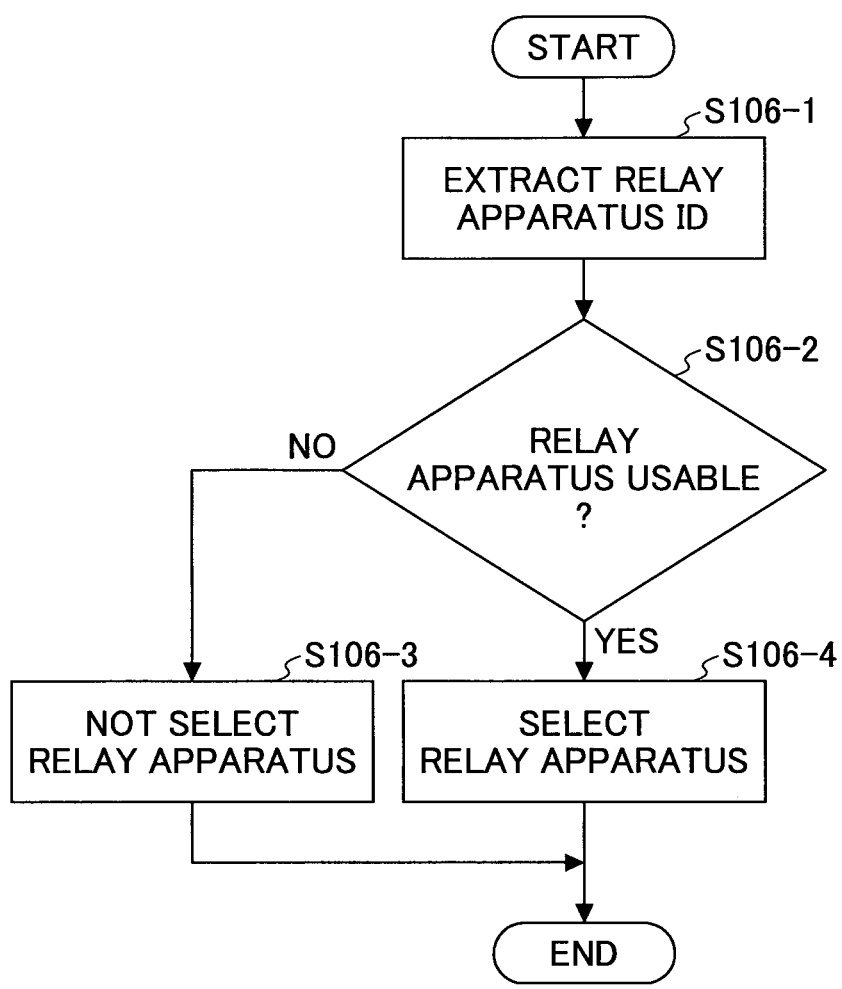
FIG. 23 is a flowchart showing a process of selecting a relay apparatus.
Figure 24:
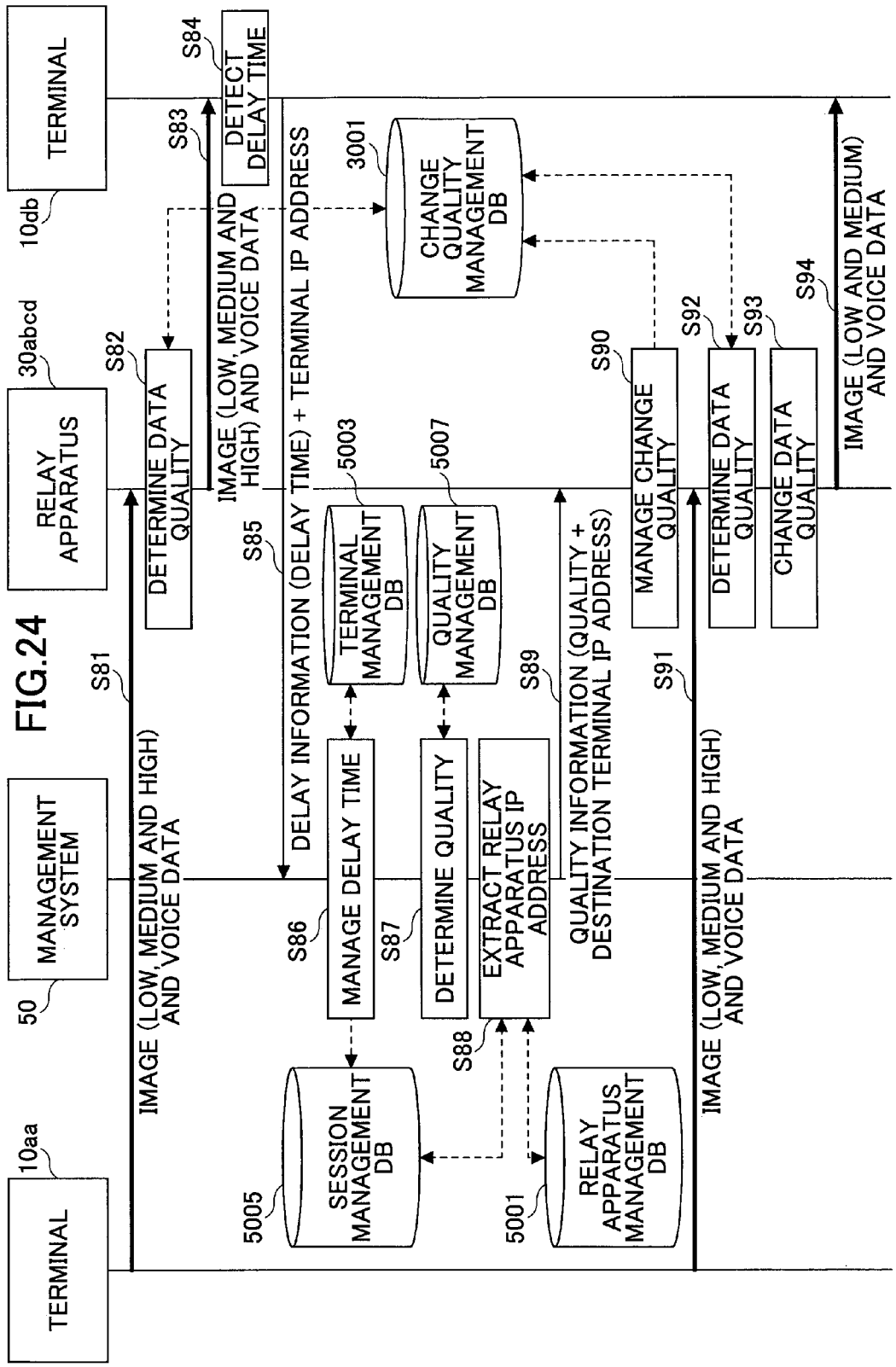
FIG. 24 is a sequence diagram showing a process of transmitting image data and voice data among transmission terminals.
Figure 25:
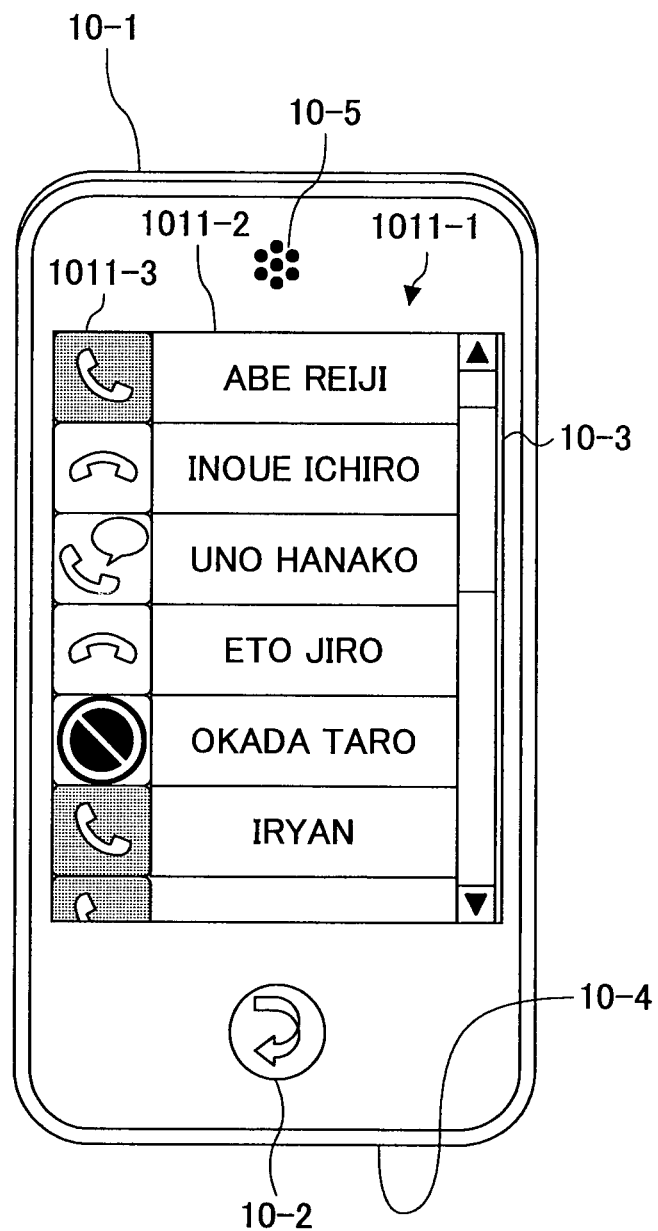
FIG. 25 shows a concept of a destination list according to another embodiment of the present invention.

Thus, the configuration and functions (or parts) of the transmission system 1 according to the embodiment have been described. Next, using FIGS. 16 through 23, a processing method in the transmission system 1 according to the embodiment will be described. FIG. 16 is a sequence diagram showing a process of managing the state information indicating the respective operating states of the relay apparatuses 30 transmitted from the relay apparatus to the management system 50. FIG. 17 is a general view showing a state where image data, voice data and various sorts of management information are transmitted in the transmission system 1. FIG. 18 is a sequence diagram showing a process in a preparation step for starting a telephone call between plural terminals 10. FIG. 19 is a sequence diagram showing a process of selecting a relay apparatus 30. FIG. 20 is a flowchart showing a process of selecting a relay apparatus 30. FIG. 21 shows a concept of the destination list according to the embodiment. FIG. 22 is a sequence diagram showing a process of requesting participation in a image and voice data session. FIG. 23 is a flowchart showing a process of selecting a relay apparatus 30. FIG. 24 is a sequence diagram showing a process of transmitting image data and voice data among terminals 10. FIG. 25 shows a concept of the destination list according to another embodiment of the present invention.

First, using FIG. 16, a process of managing the state information indicating the state of each relay apparatus 30 transmitted to the management system 50 from the own relay apparatus 30 will be described. First, at each of the relay apparatuses 30, the state detection part 32 shown in FIG. 5 periodically detects the operating state of the own apparatus (relay apparatus 30) (steps S1-1 through S1-4). Further, the state detection part 32 detects the number of ports (215, P1, P2, P3, . . . , see FIG. 4, i.e., "the number of ports usable") of the relay apparatus 30 as the own apparatus, which ports can be used for communication with terminals 10; and the number of ports ("the number of ports used") among the usable ports being actually used for communication with terminals 10. Then, in order to cause the management system 50 to manage the operating states of the respective relay apparatuses 30 in a real-time manner, the communication part 31 of each relay apparatus 30 periodically transmits the own state information to the management system 50 (steps S2-1 through S2-4). Each set of the state information includes the relay apparatus ID of the corresponding relay apparatus 30 and the operating state detected by the state detection part 32 of the relay apparatus having the relay apparatus ID. Further, each set of the state information includes port information including the above-mentioned number of ports usable and the number of ports used.

In the above-mentioned steps (steps S2-1 through S2-4) of transmitting the state information, in a case where the relay apparatus 30 transmits the state information via a firewall, it is preferable to carry out secure communication for the purpose of ensuring security. Secure communication means that communication is carried out using a means by which the communication contents are not understandable to the unauthorized persons. Specifically, for example, communication using TLS (Transport Layer Security, which may also be referred to as SSL (Secure Sockets Layer)), a tunneling service or such, may be used. For example, in the transmission system 1 shown in FIG. 1A, the communication parts 31 included in the relay apparatuses (30a, 30d) included in the intranets may transmit the state information by using SSL to the management system 50. Further, in a case where it is not possible to carry out communication using SSL, the communication parts 31 included in the relay apparatuses (30a, 30d) may map the communication to secure ports. This mapping may be realized by using a known tunneling service, for example, Stunnel (multiplatform SSL tunneling proxy) or such. Specifically, the communication parts 31 may map SSL ports to ports of mail servers, and thereby, it is possible to establish secure connections with the management system 50.

Next, the communication part 51 of the management system 50 receives the sets of state information thus sent from the respective relay apparatuses 30. In a case where the communication has been mapped as mentioned above, it is possible to receive the state information by using the tunneling service of the management system 50. The management system 50 stores the state information for each of the relay apparatus IDs in the relay apparatus management table (see FIG. 9) in the non-volatile storage part 5000 via the storing/reading processing part 59 (steps S3-1 through S3-4). Thereby, as shown in FIG. 9, in the relay apparatus management table, for each of the relay apparatus IDs, any one of operating states of "on-line", "off-line" and "in failure" is stored and managed. Further, for each of the relay apparatus IDs, the port information including the number of ports usable and the number of ports used is stored and managed. Further, at this time, for each of the relay apparatus IDs, the reception date and time when the state information has been received in the management system 50 is stored and managed. It is noted that in a case where the state information has not been sent from the relay apparatus 30, the field area of operating state and the field area of reception date and time on the corresponding record in the relay apparatus management table shown in FIG. 9 become blank, or show the operating state and the reception date and time at the time of the preceding reception.

Next, using FIG. 17, a concept of a state where image data, voice data and various sorts of management information are transmitted and received in the transmission system 1 will be described. As shown in FIG. 17, in the transmission system 1, among a terminal 10a, a terminal 10b and a terminal 10C, a management information session "sei" is established for transmitting various sorts of management information via the management system 50. Further, among the terminal 10a, terminal 10b and terminal 10C, four sessions are established for transmitting four sorts of data, i.e., image data of high resolution, image data of medium resolution, image data of low resolution and voice data, respectively, via the relay apparatus 30. These four sessions may be collectively referred to as the image and voice data session "sed".

Next, with reference to FIG. 18, a process of transmission/reception of various sorts of management information at a preparation stage before starting a telephone call between the terminal 10aa and the terminal 10db will be described. It is noted that in FIG. 18, various sorts of management information are transmitted and received by the management information session "sei".

First, when the user of the terminal 10aa turns on the power supply switch 109 shown in FIG. 3, the operation input reception part 12 shown in FIG. 5 receives the power supply turning on operation, and turns on the power supply in the terminal 10aa (step S21). Next, in response to reception of the above-mentioned power supply turning on operation, the login request part 13 automatically transmits login request information indicating a login request to the management system 50 via the communication network 2 from the communication part 11 (step S22). The login request information includes the terminal ID for identifying the own terminal (terminal 10aa) as the request source and the password. The terminal ID and password are data having been read out from the non-volatile storage part 1000 via the storing/reading processing part 19 and having been sent to the communication part 11. It is noted that when the login request information is transmitted to the management system 50 from the terminal 10aa, the management system 50 that has received the login request information can obtain the IP address of the terminal 10aa that has sent the login request information.

Next, the terminal authentication part 52 in the management system 50 searches the terminal authentication management DB 5002 (see FIG. 10) of the non-volatile storage part 5000 using the terminal ID and the password included in the login request information having been received via the communication part 51 as search keys, determines whether the same terminal ID and password are managed in the terminal authentication management DB 5002, and thus, carries out authentication of the terminal (step S23).

In a case where it has been determined by the terminal authentication part 52 that the login request is one sent from the terminal 10 having proper use authority since the same terminal ID and password are managed, the state management part 53 stores, on the record identified by the terminal ID and the destination name of the terminal 10aa, the operating state, the reception date and time when the above-mentioned login request information has been received and the IP address of the terminal 10aa in the terminal management table (see FIG. 11) of the terminal management DB 5003 in a manner of associating them with each other (step S24). Thereby, in the terminal management table shown in FIG. 11, the operating state "on-line", the reception date and time "2009.11.10.13:40" and the IP address "1.2.1.3" are associated with the terminal ID "01aa" and are managed.

Then, the communication part 51 of the management system 50 transmits authentication result information indicating the result of the authentication obtained by the terminal authentication part 52 to the request source terminal (terminal 10aa), having carried out the above-mentioned login request, via the communication network 2 (step S25).

Below, description will be carried out continuously supposing a case where the terminal authentication part 52 has determined that the terminal having carried out the above-mentioned login request has the proper use authority. At the terminal 10aa, when receiving the authentication result information indicating the result of having been determined as a terminal having the proper use authority, the communication part 11 transmits destination list request information indicating to request the destination list to the management system 50 via the communication network 2 (step S26). Thereby, the communication part 51 of the management system 50 receives the destination list request information.

Next, the terminal extraction part 54 of the management system 50 searches the destination list management table of the destination list management DB 5004 (see FIG. 12) using the terminal ID "01aa" of the request source terminal (terminal 10aa) having carried out the login request as a search key, and reads out and extracts the terminal IDs as candidates for a destination terminal which can carry out a telephone call with the request source terminal (terminal 10aa) (step S27). Further, the terminal extraction part 54 searches the terminal management table (see FIG. 11) of the terminal management DB 5003 using the thus-extracted terminal IDs, and reads and extracts the destination names corresponding to the terminal IDs. Here, the terminal IDs ("01ab", "01ba", "01bb", . . . ) of destination terminals (10ab, 10ba, 10bb, . . . ) corresponding to the terminal ID "01aa" of the request source terminal (terminal 10aa), and the terminal names ("A company Tokyo office AB terminal", "B company Osaka office BA terminal", . . . ) are extracted.

Next, the communication part 51 of the management system 50 reads the data of the destination list frame (data of the destination list frame 311-1 part shown in FIG. 21) from the non-volatile storage part 5000 via the storing/reading processing part 59 (step S28), and further, transmits "destination list information (destination list frame, terminal IDs and destination names)" including the destination list frame, the terminal IDs and the destination names thus extracted by the terminal extraction part 54 to the request source terminal (terminal 10aa) (step S29). Thereby, at the request source terminal (terminal 10aa), the communication part 11 receives the destination list information, and the storing/reading processing part 19 stores the destination list information in the volatile storage part 1002 (step S30).

Thus, according to the embodiment, the respective terminals 10 do not manage the destination list information but the management system 50 manages the destination list information for all the terminals 10 in a unifying manner. Thereby, even in a case where a new terminal 10 comes to be included in the transmission system 1, in a case where a terminal 10 of a new type comes to be included instead of an existing terminal 10 or in a case where the appearance or such of the destination list frame is to be changed, the management system 50 deals with the matter, and thus, it is possible to eliminate the work of changing the destination list being carried out by the terminals 10.

Further, the terminal state obtaining part 55 searches the terminal management table (see FIG. 11) using the terminal IDs ("01ab", "01ba" and "01bb", . . . ) of the candidates for a destination terminal extracted by the terminal extraction part 54 as mentioned above as search keys, reads the respective operating states for the above-mentioned respective terminal IDs extracted by the terminal extraction part 54, and obtains the respective operating states of the terminals (10ab, 10ba, 10bb, . . . ) (step S31).

Next, the communication part 51 transmits a set of "terminal operating state information" (i.e., the state information indicating the operating state of a terminal 10) including the terminal ID "01ab" extracted as one of the candidates for a destination terminal by the terminal extraction part 54 in step S27 and the operating state "off-line" of the corresponding destination terminal (terminal 10*ab*) to the request source terminal (terminal 10*aa*) via the communication network 2 (step S32). Further, also in step S32, the communication part 51 transmits another set of "terminal operating state information" including the terminal ID "01ba" extracted as another of the candidates for a destination terminal by the terminal extraction part 54 in step S27 and the operating state "on-line (temporarily interrupted)" of the corresponding destination terminal (terminal 10*ba*) to the request source terminal (terminal 10*aa*) via the communication network 2. In the same way, in step S32, the communication part 51 transmits respective sets of "terminal operating state information" for all of the remaining terminals extracted as the candidates for a destination terminal by the terminal extraction part 54 in step S27 to the request source terminal (terminal 10*aa*) via the communication network 2, separately.

Next, the storing/reading processing part 19 of the request source terminal (terminal 10*aa*) stores the respective sets of the terminal operating state information received from the management system 50 in the volatile storage part 1002, in sequence (step S33). Thereby, the request source terminal (terminal 10*aa*) can obtain the operating states of the respective terminals 10*ab*, . . . at the current time which are the candidates for a destination terminal which can carry out a telephone call with the request source terminal (terminal 10*aa*).

Next, the destination list creation part 20 of the request source terminal (terminal 10*aa*) creates a destination list on which the states of the terminals 10 as the destination candidates are reflected based on the destination list information and the terminal operating state information stored in the volatile storage part 1002. Further, the display control part 16 controls timing of displaying the destination list on the display device 120 shown in FIG. 3 (step S34).

Thus, as shown in FIG. 21, the destination list where the respective destination names 311-2 and so forth and the icons 311-3*a* and so forth on which the respective sets of the terminal operating state information are reflected are displayed is displayed on the display device 120*aa*.

On the other hand, returning to FIG. 18, the terminal extraction part 54 of the management system 50 searches the destination list management table of the destination list management DB 5004 (see FIG. 12) using the terminal ID "01aa" of the request source terminal (terminal 10*aa*) having carried out the login request as a search key, and extracts the terminal IDs of the other request source terminals which have registered the above-mentioned request source terminal (terminal 10*aa*) as a candidate for a destination terminal (step S35). In the destination list management table shown in FIG. 12, the terminal IDs of the other request source terminals to be thus extracted are "01ab", "01ba" and "01db".

Next, the terminal state obtaining part 55 of the management system 50 searches the terminal management table of the terminal management DB 5002 (see FIG. 11) using the terminal ID "01aa" of the request source terminal (terminal 10*aa*) having carried out the above-mentioned login request, and obtains the operating state of the request source terminal (terminal 10*aa*) having carried out the login request (step S36).

Next, the communication part 51 transmits "terminal state information" including the terminal ID "01aa" of the request source terminal (terminal 10*aa*) and the operating state "on-line" obtained in step S36 to the terminals (10*ba* and 10*db*) which have the operating state of "on-line" in the terminal management table of the terminal management DB 5003 (see FIG. 11) among the terminals (10*ab*, 10*ba* and 10*db*) having the terminal IDs (01ab, 01ba and 01db) extracted in step S35 (step S37-1, S37-2). It is noted that when the communication part 51 is to thus transmit the terminal state information to the terminals 10*ba* and 10*db*, the communication part 51 reads the IP addresses of these terminals managed in the terminal management table shown in FIG. 11 based on the respective terminal IDs ("01ba" and "01db"). Thereby, it is possible to inform the respective destination terminals (terminals 10*ba* and 10*db*) which can carry out a telephone call with the request source terminal (terminal 10*aa*) having carried out the login request as the destination, of the terminal ID "01aa" and the operating state "on-line" of the request source terminal (terminal 10*aa*) having carried out the above-mentioned login request.

On the other hand, also at each of the other terminals 10, the same as the above-mentioned step S21, when the user turns on the power supply switch 109 shown in FIG. 3, the operation input reception part 12 shown in FIG. 5 receives the power supply turning on operation, and the processes the same as those of steps S22 through S38-1 and S38-2 mentioned above are carried out. Therefore, the description therefor will be omitted.

Next, with reference to FIG. 19, a process when a terminal 10 starts communication with another terminal 10 will be described. It is noted that in FIG. 19, the various sorts of management information are transmitted and received wholly by the management information session "sei". Further, according to the embodiment, the request source terminal (terminal 10*aa*) can request to start communication by selecting at least one of the terminals 10 having the operating state "on-line" according to the state information (terminal operating state information) received in the above-mentioned step S32 from among the terminals 10 as the candidates for a destination, or the own terminal (terminal 10*aa*). It is noted that to select the own terminal (terminal 10*aa*) means that the request source terminal (terminal 10*aa*) requests to connect only the own terminal to the relay apparatus 30. Below, a process of requesting to start communication will be described.

First, when the user of the request source terminal (terminal 10*aa*) presses the operating button 108 shown in FIG. 3 to select a destination terminal (supposing the terminal 10*db*, for example), the operation input reception part 12 shown in FIG. 5 receives the request for starting a telephone call with the destination terminal (terminal 10*db*) (step S41). Then, the communication part 11 of the request source terminal 10*aa* transmits start request information including the terminal ID "01aa" of the terminal 10*aa* and the terminal ID "01db" of the thus-selected destination terminal (terminal 10*db*) and indicating an intention to start a telephone call, to the management system 50 (step S42). Thereby, the communication part 51 of the management part 50 receives the start request information, and can obtain the IP address of the request source terminal (terminal 10*aa*) (transmission source).

Then, the state management part 53 changes the field areas of operating state on the records of the above-mentioned terminal ID "01aa" and terminal ID "01db", respectively, in the terminal management DB 5003 (see FIG. 11), into "on telephone call", based on the terminal ID "01aa" of the request source terminal (terminal 10*aa*) and the terminal ID "01db" of the destination terminal (terminal 10*db*) included in the start request information (step S43). It is noted that in this state, although a telephone call has not yet been started between the request source terminal (terminal 10*aa*) and the destination terminal (terminal 10*db*), the request source terminal (terminal 10aa) and the destination terminal (terminal 10db) thus enter the state of "on telephone call". Therefore, when another terminal intends to carry out a telephone call with the request source terminal (terminal 10aa) or the destination terminal (terminal 10db), a notification sound or display indicating the "on telephone call" state is output.

Next, a process of carrying out a session for selecting a relay apparatus 30 will be described. First, the session ID generating part 56a generates a session ID "se1" for identifying a session (image and voice data session "sed") for carrying out communication with each terminal 10 requested by the request source terminal (terminal 10aa) (step S44).

Then, the relay apparatus selection part 56 selects a relay apparatus 30 for relaying a telephone call between the request source terminal (terminal 10aa) and the destination terminal (terminal 10db) based on the relay apparatus management DB 5001 (step S45). A detailed process of selecting a relay apparatus 30 will now be described with reference to FIG. 20.

First, the destination determination part 56b determines whether the terminal ID of the destination terminal and the terminal ID of the request source terminal (terminal 10aa) included in the start request information sent from the request source terminal (terminal 10aa) are the same (i.e., whether the own terminal has been selected as the destination) (step S45-1). In a case where the terminal ID of the destination terminal is the same as the terminal ID of the request source terminal, the selection part 56e selects the relay apparatus 30abcd (common relay apparatus) (step S45-4). This is because it is preferable to select a relay apparatus 30 to which any terminal can connect since a communication network with which a terminal which will participate in the session thereafter or an area where a terminal which will participate in the session thereafter is connected to the communication network 2 is not known.

In a case where the terminal ID of the destination terminal is not the same as the terminal ID of the request source terminal (step S45-1 NO), the attribute extraction part 56c searches the attribute management table of the attribute management DB 5008 (see FIG. 15) based on the terminal IDs of the request source terminal (terminal 10aa) and the destination terminal (terminal 10db), and extracts the corresponding intranet relay apparatus IDs. Then, the attribute determination part 56d determines whether the extracted intranet relay apparatus IDs are the same (whether the request source terminal and the destination terminal can use the same intranet relay apparatus 30) (step S45-2). In a case where the extracted intranet relay apparatus IDs are the same (step S45-2 YES), the selection part 56e selects the relay apparatus 30 (intranet relay apparatus) identified by the extracted intranet relay apparatus ID (step S45-6). Thereby, the selected relay apparatus 30 and all the terminals participating in the session will be connected to the same intranet. Thus, the communication paths are shortened, and the communication rates are improved. Also, content data to be communicated that does not need to clear any firewall, and security is improved.

It is noted that even in a case where the respective intranet relay apparatus IDs extracted by the attribute extraction part 56c are the same, the process starting from step S45-2 NO may be carried out depending on a state of the relay apparatus identified by this intranet relay apparatus ID. In this case, the management system 50 searches the relay apparatus management table (see FIG. 9) of the non-volatile storage part 5000 using the storing/reading processing part 59 based on the relay apparatus ID of the intranet relay apparatus, and extracts the corresponding operating state. In a case where the extracted operating state is "off-line", the management system 50 proceeds to the process starting from step S45-2 NO. Further, in another example, the management system 50 searches the relay apparatus management table (see FIG. 9) via the storing/reading processing part 59 based on the relay apparatus ID of the intranet relay apparatus, and extracts the corresponding number of ports used and number of ports usable. Then, in a case where an operating rate calculated by the extracted number of ports used and number of ports usable is larger than a certain value, the management system 50 proceeds to the process starting from step S45-2 NO.

In a case where the intranet relay apparatus IDs extracted by the attribute extraction part 56c are not the same (step S45-2 NO), the attribute extraction part 56c searches the attribute management table of the attribute management DB 5008 (see FIG. 15) based on the terminal IDs of the request source terminal (terminal 10aa) and the destination terminal (terminal 10db), and extracts the corresponding segment relay apparatus IDs. In a case where the extracted segment relay apparatus IDs are the same (step S45-3 YES), the selection part 56e selects the relay apparatus 30 (segment relay apparatus) identified by the extracted segment relay apparatus ID (step S45-5). Thereby, the selected relay apparatus 30 and all the terminals participating in the session will be connected to the communication network 2 from the same segment. Thus, the communication paths are shortened, and the communication rates are improved.

It is noted that even in a case where the respective segment relay apparatus IDs extracted by the attribute extraction part 56c are the same, the process starting from step S45-3 NO may be carried out depending on a state of the relay apparatus identified by this segment relay apparatus ID. In this case, the management system 50 searches the relay apparatus management table (see FIG. 9) of the non-volatile storage part 5000 using the storing/reading processing part 59 based on the relay apparatus ID of the segment relay apparatus, and extracts the corresponding operating state. In a case where the extracted operating state is "off-line", the management system 50 proceeds to the process starting from step S45-3 NO. Further, in another example, the management system 50 searches the relay apparatus management table (see FIG. 9) via the storing/reading processing part 59 based on the relay apparatus ID of the segment relay apparatus, and extracts the corresponding number of ports used and number of ports usable. Then, in a case where an operating rate calculated by the extracted number of ports used and number of ports usable is larger than a certain value, the management system 50 proceeds to the process starting from step S45-3 NO.

In a case where the segment relay apparatus IDs extracted by the attribute extraction part 56c are not the same (step S45-3 NO), the selection part 56e selects the relay apparatus 30abcd (common relay apparatus) (step S45-4). This is because the respective terminals participating in the session cannot use the relay apparatus 30 in the same communication network or the relay apparatus 30 in the same segment.

When the process of selecting the relay apparatus 30 is thus completed, the session management part 57 stores, in the session management table (see FIG. 13) of the session management DB 5005 of the non-volatile storage part 5000, the session ID "se1" generated in step S44, the terminal ID of the request source terminal (terminal 10aa), the terminal ID of the destination terminal (terminal 10db) and the relay apparatus ID of the selected relay apparatus, and manages them (step S46).

Next, the communication part 51 shown in FIG. 5 transmits, to the request source terminal (terminal 10aa) via the communication network 2, the session ID generated by the session ID generation part 56a and relay apparatus connection information used for connecting to the relay apparatus selected by the selection part 56e (step S48). The relay apparatus connection information may include the IP address, authentication information, port numbers and so forth of the relay apparatus 30. Thereby, the request source terminal (terminal 10aa) can obtain the relay apparatus connection information used for connecting to the relay apparatus 30 used for relaying image and voice data in execution of the session of the session ID "se1".

Next, the communication part 51 transmits, to the destination terminal (terminal 10db), the terminal ID of the request source terminal (terminal 10aa), start request information including the session ID "se1", the relay apparatus connection information used for connecting to the relay apparatus 30 and the IP address of the management system 50 (step S48). Thereby, the communication part 11 of the terminal 10db receives the above-mentioned start request information, and obtains the relay apparatus connection information used for connecting to the relay apparatus 30 used for relaying content data and the IP address "1.1.1.2" of the management system 50 (transmission source).

Next, the communication part 51 of the management system 50 transmits, to the selected relay apparatus 30 via the communication network 2, relay start request information indicating a request to start relaying (step S49). The relay start request information includes the respective IP addresses of the request source terminal (terminal 10aa) and the destination terminal (terminal 10db) for which content data is relayed. Thereby, the relay apparatus 30 establishes a session (image and voice data session "sed") for carrying out a telephone call with three sets of image data of high resolution, medium resolution and low resolution and voice data (step S50). Thereby, the terminals 10 can start a TV conference.

Next, using FIG. 22, a process of another terminal 10 participating in the telephone call session (image and voice data session "sed") after the telephone call session is established between the request source terminal (terminal 10aa) and the destination terminal (terminal 10db) will be described. FIG. 22 is a sequence diagram showing a process of requesting participation in the image and voice data session "sed". It is noted that in FIG. 22, a process is shown where all of the various sorts of management information are transmitted and received by the management information session "sei".

First, as a result of the user of the request source terminal (terminal 10aa) pressing the operating button 108 shown in FIG. 3, an input indicating another terminal 10 to be invited to the image and voice data session "sed" is received (step S101). Then, the communication part 11 of the terminal 10aa transmits session ID notification request information, including the terminal ID of the terminal 10aa, the terminal ID of the other terminal 10 and the session ID, and requesting to notify the other terminal 10 of these items of information, to the management system 50 (step S102). When receiving the session ID notification request information, the communication part 51 of the management system 50 transmits session ID notification information, including the terminal ID of the request source terminal (terminal 10aa) and the session ID, to the other terminal 10 (step S103).

When receiving the above-mentioned session ID notification information, the other terminal 10 receives an intention of the user of the other terminal 10 to participate in the image and voice data session "sed" (step S104). Here, as a result of the user of the other terminal 10 pressing the operating button 108 shown in FIG. 3, the user's intention to request to participate in the image and voice data session "sed" is received. Thereby, the communication part 11 of the other terminal 10 transmits, to the management system 50, session participation request information including the terminal ID of the other terminal 10 and the session ID (step S105).

Next, the management system 50 carries out a process of selecting a relay apparatus 30 (step S106). The process of selecting a relay apparatus 30 will be described in detail using FIG. 23. FIG. 23 is a flowchart showing a process of selecting a relay apparatus 30. First, the session management part 57 of the management system 50 searches the session management table (see FIG. 13) of the session management DB 5005 using the session ID included in the session participation request information as a key, and extracts the relay apparatus ID (step S106-1). Next, the attribute extraction part 56c searches the attribute management table (see FIG. 15) of the attribute management DB 5008 based on the terminal ID of the other terminal 10, and extracts the corresponding intranet relay apparatus ID and segment relay apparatus ID.

Next, the attribute determination part 56d determines whether the other terminal 10 can use the relay apparatus 30 identified by the relay apparatus ID extracted by the session management part 57 in step S106-1 can be used (step S106-2). Specifically, in a case where the relay apparatus ID extracted by the session management part 57 in step S106-1 is the relay apparatus ID of the common relay apparatus 30abcd, the attribute determination part 56d determines that the relay apparatus 30 identified by the relay apparatus ID extracted by the session management part 57 in step S106-1 can be used. In a case where the relay apparatus ID extracted by the session management part 57 is not the relay apparatus ID of the common relay apparatus 30abcd, and is consistent with any of the relay apparatus IDs extracted by the attribute extraction part 56c in step S106-1, the attribute determination part 56d determines that the relay apparatus 30 identified by the relay apparatus ID extracted by the session management part 57 in step S106-1 can be used. On the other hand, in a case where the relay apparatus ID extracted by the session management part 57 in step S106-1 is not the relay apparatus ID of the common relay apparatus 30abcd, and is consistent with none of the relay apparatus IDs extracted by the attribute extraction part 56c in step S106-1, the attribute determination part 56d determines that the relay apparatus 30 identified by the relay apparatus ID extracted by the session management part 57 in step S106-1 cannot be used.

In the case where it has been determined that the relay apparatus 30 identified by the relay apparatus ID extracted by the session management part 57 in step S106-1 can be used (step S106-2 YES), the selection part 56e selects the relay apparatus 30 which is being used for the image and voice data session "sed" and extracted by the session management part 57 in step S106-1 (step S106-4). In a case where it has been determined that the relay apparatus 30 identified by the relay apparatus ID extracted by the session management part 57 in step S106-1 cannot be used (step S106-2 NO), the selection part 56e does not select the relay apparatus 30 which is being used for the image and voice data session "sed" and extracted by the session management part 57 in step S106-1 (step S106-3). It is noted that in the case where it has been determined that the relay apparatus 30 identified by the relay apparatus ID extracted by the session management part 57 in step S106-1 cannot be used (step S106-2 NO), the selection part 56e may newly select the common relay apparatus 30abcd. Below, a process to be carried out thereafter will be described supposing the case where the selection part 56e has selected the relay apparatus 30 which is being used for the image and voice data session "sed" and extracted by the session management part 57 in step S106-1.

When the selection of the relay apparatus 30 is thus completed, the session management part 57 stores, in the session management table (see FIG. 13) of the session management DB 5005 of the non-volatile storage part 5000, the session ID included in the session participation request information, the terminal ID of the request source terminal (terminal 10aa), the terminal ID of the destination terminal (terminal 10db), the terminal ID of the other terminal 10 and the relay apparatus ID of the selected relay apparatus 30, and manages them (step S107).

Next, the state management part 53 of the management system 50 changes the field area of operating state on the record including the terminal ID of the other terminal 10 in the terminal management table (see FIG. 11) of the terminal management DB 5003, based on the terminal ID of the other terminal 10 included in the session participation request information, into "on telephone call" (step S108).

Next, the communication part 51 of the management system 50 transmits a participation notification including the terminal ID of the other terminal 10 participating in the image and voice data session "sed" and the session ID to the request source terminal (terminal 10aa) and the destination terminal (terminal 10db) which have already started the image and voice data session "sed" (steps S109-1, S109-2). Thereby, the request source terminal (terminal 10aa) and the destination terminal (terminal 10db) can determine that the other terminal 10 participates in the image and voice data session "sed". Further, the communication part 51 of the management system 50 transmits participation permission notification including the session ID for participating in the image and voice data session "sed" and the relay apparatus connection information used for connecting with the relay apparatus 30 to the other terminal 10 which starts the image and voice data session "sed" (step S110). Thereby, the other terminal 10 determines that participation in the image and voice data session "sed" has been permitted, and also, can connect with the relay apparatus 30. When receiving the participation permission notification, the communication part 11 of the other terminal 10 transmits, to the relay apparatus 30, the session ID and the relay apparatus connection information (step S110), and connects with the relay apparatus 30. Thereby, the other terminal 10 can participate in the image and voice data session "sed".

Next, with reference to FIGS. 5 and 24, a process of transmitting image data and voice data between the request source terminal (terminal 10aa) and the destination terminal (terminal 10db) for the purpose of carrying out a telephone call of a TV conference will be described. It is supposed that a relay apparatus which relays image data and voice data between these terminals is the relay apparatus 30abcd. It is noted that since processes of transmission and reception of image data and voice data, detection of a delay time described later and so forth are identical between transmission of image data and voice data in one direction from the terminal 10aa to the terminal 10db and transmission of image data and voice data in the reverse direction from the terminal 10db to the terminal 10aa, description will be carried out only for the communication in the one direction and description for the communication in the reverse direction will be omitted.

First, the request source terminal (terminal 10aa) transmits image data of an object photographed by the photographing part 14 and voice data of voice audio input by the voice input part 15a to the relay apparatus 30abcd via the communication network 2 from the communication part 11 through the image and voice data session "sed" (step S81). It is noted that in this case, first, image data of high image quality including the three resolutions of the low resolution, the medium resolution and the high resolution, and the voice data are transmitted. Thus, the relay apparatus 30abcd receives the image data of the three resolutions and the voice data via the communication part 31. Then, the data quality determination part 33 searches the change quality management table (see FIG. 7) using the IP address "1.3.2.4" of the destination terminal (terminal 10db), extracts the corresponding image quality of image data to relay, and thus, determines the image quality of image data to relay (step S82). In this case, supposing that the thus-determined image quality of image data is "high image quality", it is the same as the image quality of the image data received via the communication part 31. Therefore, the relay apparatus 30abcd transfers the image data of the image quality as it is and the voice data of the voice quality as it is to the destination terminal (terminal 10db) through the image and voice data session "sed" (step S83). Thus, the destination terminal (terminal 10db) receives via the communication part 11 the image data of high image quality including the three resolutions of the low resolution, medium resolution and high resolution, and the voice data. Then, the display control part 16 of the destination terminal (terminal 10db) can display an image based on the image data on the display device 120, and the voice output part 15b can output the voice audio based on the voice data.

Next, the delay detection part 18 of the terminal 10db detects the delay time of reception of the image data received via the communication part 11 at certain time intervals (for example, once a second) (step S84). It is noted that description will be carried out below supposing a case where the thus-detected delay time is 200 ms. The detection of the delay time of reception of image data may be carried out in such a manner that, for example, information indicating transmission date and time when the image data is transmitted from the transmission source terminal is attached to the image data, and the transmission destination terminal calculates the delay time based on the difference between the transmission and reception of the received image data, using the information indicating transmission date and time attached to the received image data and reception date and time when the received image data has been received in the transmission destination terminal.

The communication part 11 of the destination terminal (terminal 10db) transmits delay information indicating the delay time "200 ms" to the management system 50 via the communication network 2 through the management information session "sei" (step S85). Thereby, the management system 50 obtains the delay time and also obtains the IP address "1.3.2.4" of the terminal 10db that is the transmission source of the delay information.

Next, the delay time management part 60 of the management system 50 searches the terminal management table (see FIG. 11) using the IP address "1.3.2.4" of the above-mentioned destination terminal (terminal 10db) as a search key, extracts the corresponding terminal ID "01db", stores the delay time "200 ms" indicated by the above-mentioned delay information at the field area of delay time on the record of the above-mentioned terminal ID "01db" in the session management table of the session management DB 5005 (see FIG. 13), and manages it (step S86).

Next, the quality determination part 58 searches the quality management DB 5007 (see FIG. 14) using the above-mentioned delay time "200 ms" as a search key, extracts the corresponding image quality "medium image quality" of image data, and thus determines the image quality to be "medium image quality" (step S87).

Next, the communication part 51 obtains the relay apparatus ID "111abcd" associated with the above-mentioned terminal ID "01db" in the session management table of the session management DB (see FIG. 13), searches the relay apparatus management table (see FIG. 9) using the relay apparatus ID "111abcd" as a search key, and extracts the IP address "1.1.1.3" of the corresponding relay apparatus 30abcd (step S88). Then, the communication part 51 transmits quality information indicating the image quality "medium image quality" determined in step S87 to the relay apparatus 30abcd via the communication network 2 through the management information session "sei" (step S89). The quality information includes the IP address "1.3.2.4" of the destination terminal (terminal 10db) used as the search key in step S86. Thereby, the change quality management part 34 in the relay apparatus 30abcd stores the IP address "1.3.2.4" of the terminal 10 (here, the terminal 10db) as the transmission destination and the image quality "medium image quality" of image data to be relayed, in the change quality management table (see FIG. 7) in a manner of associating them with one another, and manages them (step S90).

Next, the terminal 10aa continuously transmits image data of high image quality including the three resolutions of the low resolution, medium resolution and high resolution and voice data to the relay apparatus 30abcd through the image and voice data session "sed", the same as step S81 mentioned above (step S91). Then, the same as step S82 mentioned above, the data quality determination part 33 of the relay apparatus 30abcd searches the change quality management table (see FIG. 7) using the IP address "1.3.2.4" of the destination terminal (terminal 10db) as a search key, extracts the corresponding image quality "medium image quality" to relay, and thus determines the quality of an image of image data to relay (step S92). In this example, the determined image quality of image data is "medium image quality" which is lower than the image quality "high image quality" of the image data received via the communication part 31. Therefore, the data quality changing part 35 reduces the image quality of the image data from "high image quality" to "medium image quality", and thus changes the quality of the image of the image data (step S93). Then, the communication part 31 transmits the image data for which the image quality has been thus changed to "medium image quality" and the voice data for which the voice quality has not been changed, to the terminal 10db via the communication network 2 through the image and voice data session "sed" (step S94). Thus, in the case where the delay in reception occurs in the destination terminal (terminal 10db) that receives the image data, the relay apparatus 30abcd changes (reduces) the quality of the image to reduce the delay, and thus, it is possible to prevent the persons participating in the TV conference from feeling that something is wrong.

Main Advantageous Effects of Embodiment

As described above, according to the embodiment, in a case of having determined that plural terminals have the same first attributes, the management system 50 selects a first relay apparatus. In a case of having determined that the plural terminals do not have the same first attributes, the management system 50 selects a second relay apparatus in a case of having determined that the plural terminals have the same second attributes. In a case of having determined that the plural terminals do not have the same first attributes, the management system 50 selects a third relay apparatus in a case of having determined that the plural terminals do not have the same second attributes. Thereby, depending on the plural independent attributes of each of the plural terminals participating in a conference, the management apparatus 30 can select an optimum relay apparatus.

Further, according to the embodiment, the management system 50 has the attribute management DB 5008 in which terminal identification information used for identifying terminals 10, first attribute information indicating the first attributes of the terminals 10 and second attribute information indicating the second attributes of the terminals 10 are associated and managed. Thereby, the management system 50 can easily determine whether plural terminals 10 have the same first attributes and whether the plural terminals 10 have the same second attributes.

Further, according to the embodiment, the first attribute may be an attribute concerning the communication networks (intranets, i.e., parts of the communication network 2) to which the terminals 10 are connected, respectively, and the second attribute may be an attribute concerning the areas in which the terminals 10 exist, respectively. Thereby, the management system 50 can select a relay apparatus 30 depending on the attributes concerning the communication networks (parts of the communication network 2) to which respective terminals 10 participating in a conference are connected, the areas in which the respective terminals 10 are connected with the communication network 2, or such.

Further, according to the embodiment, an intranet relay apparatus belongs to an intranet the same as that of a terminal 10, and a segment relay apparatus is installed at a segment the same as that of a terminal 10. In this case, when all the terminals 10 participating in a conference are connected with the intranet, the management system 50 selects the intranet relay apparatus. Thereby, the communication paths are shortened, and the communication rates are improved. Also, content data to be communicated does not need to clear any firewall, and security is improved. When all the terminals 10 participating in a conference exist in the same area, the management system 50 selects the segment relay apparatus. Thereby, the communication paths are shortened, and the communication rates are improved.

Further, according to the embodiment, the first relay apparatus transmits first operating information indicating the operating state of the first relay apparatus to the management system 50, and the second relay apparatus transmits second operating information indicating the operating state of the second relay apparatus to the management system 50. Thereby, the management system 50 can select any one of the first and second relay apparatuses based on the respective operating states.

Further, according to the embodiment, the first relay apparatus transmits first port information indicating the states of the ports of the first relay apparatus to be used for communication with the terminal 10 to the management system 50, and the second relay apparatus transmits second port information indicating the states of the ports of the second relay apparatus to be used for communication with the terminal 10 to the management system 50. Thereby, the management system 50 can select any one of the first and second relay apparatuses based on the obtained states of the ports of the first and second relay apparatuses.

Further, according to the embodiment, the first relay apparatus carries out secure communication with the management system 50. Thereby, the operating information and the port information of the first relay apparatus can be safely transmitted to the management system 50.

Supplement to Embodiment

According to the embodiment, the attribute extraction part 56*c* searches the attribute management table of the attribute management DB 5008 based on the terminal IDs of the request source terminal (terminal 10*aa*) and the destination terminal (terminal 10*db*) and extracts the corresponding attributes. However, it is not necessary to be limited to this method. It is also possible that when the terminal 10*aa* and the terminal 10*db* connect to the management system 50, the respective terminals transmit messages including the attributes of the respective terminals obtained at a time of the connections and the attribute extraction part 56*c* extracts the attributes included in the messages. Thereby, it is possible to obtain an advantageous effect of being able to select a relay apparatus 30 based on the attributes of the respective terminals obtained at a time of the connections.

It is noted that each of the management system 50 and the program providing system 90 in the embodiment may be realized by a single computer, or may be realized by plural computers where respective parts (or functions) are divided and are freely allocated to the plural computers. Further, in a case where the program providing system 90 is realized by a single computer, a program to be transmitted by the program providing system 90 may be transmitted as having been divided into plural modules, or may be transmitted as not having been divided into plural modules. Further, in a case where the program providing system 90 is realized by plural computers, divided plural modules may be transmitted by the plural computers, respectively.

Further, recording media storing the program for the terminals 10, the program for the relay apparatuses 30 and the program for transmission management, the HD 204 storing these programs, and the program providing system 90 including this HD 204 are used as program products in a case where the program for the terminals 10, the program for the relay apparatuses 30 and the program for transmission management are provided to users or such in the home country or aboard.

Further, in the embodiment, quality of image data is managed in particular using resolution of an image of image data as one example of quality of an image of image data relayed by the relay apparatus 30, using the change quality management table shown in FIG. 7 and the quality management table shown in FIG. 14. However, quality of data is not limited thereto, and as other examples of quality of data, data may be managed in particular using a depth (for example, color depth) of image quality of image data, a sampling frequency in voice of voice data, a bit length in voice of voice data, or such.

Further, in FIGS. 9, 11 and 13, the reception dates and times are managed. However, it is not necessary to be limited thereto, and it may be sufficient that at least the reception times from among the reception dates and times are managed.

Further, according to the embodiment, the IP addresses of relay apparatuses 30 in FIG. 9, and the IP addresses of terminals 10 in FIG. 11 are managed. However, it is not necessary to be limited to this method, and as long as relay apparatus identification information for identifying a relay apparatus 30 in the communication network 2 or terminal identification information for identifying a terminal 10 in the communication network 2 is used, a FQDN (Fully Qualified Domain Name) thereof may be managed. In this case, the IP address corresponding to the FQDN will be obtained from a well-known DNS (Domain Name System) server. It is noted that "relay apparatus identification information for identifying a relay apparatus 30 in the communication network 2" may also be expressed as "relay apparatus connecting destination information indicating a connecting destination for a relay apparatus 30 in the communication network 2" or "relay apparatus destination information indicating a destination for a relay apparatus 30 in the communication network 2". Similarly, "terminal identification information for identifying a terminal 10 in the communication network 2" may also be expressed as "terminal connecting destination information indicating a connecting destination for a terminal 10 in the communication network 2" or "terminal destination information indicating a destination for a terminal 10 in the communication network 2".

According to the embodiment, the term "TV conference" is used as a term which may be replaced by "video conference".

Further, in the embodiment, as an example of the transmission system 1, a case of a TV conference system has been described. However, it is not necessary to be limited thereto, and an example of the transmission system 1 may be a telephone system for IP (Internet Protocol) telephone, Internet telephone, or such. Further, the transmission system 1 may be an automotive navigation system. In this case, for example, one of the terminals 10 corresponds to an automotive navigation apparatus mounted in one automobile, and another of the terminals 10 corresponds to a management terminal or a management server in a management center which manages the automotive navigation system, or an automotive navigation apparatus mounted in another automobile. Further, the transmission system 1 may be a voice conference system, or a PC (Personal Computer) screen sharing system.

Further, the transmission system 1 may be a communication system for cellular phones. In this case, the terminals 10 correspond to cellular phones. FIG. 25 shows an example of displaying a destination list 1011-1 in this case (corresponding to the destination list shown in FIG. 21 in the above-described embodiment). The destination list 1011-1 includes icons 1011-3 (corresponding to the icons 311-3*a*, 311-3*b* and 311-3*c* and so forth in FIG. 21) indicating the states for respective destination names 1011-2 ("ABE REIJI", "INOUE ICHIRO", . . . ) and the respective destination names 1011-2 (corresponding to the destination name 311-2 and so forth in FIG. 21). The terminal 10 as a cellular phone includes a body 10-1 of the cellular phone, a menu screen page display button 10-2 provided on the body 10-1, a display part 10-3 provided on the body 10-1, a microphone 10-4 provided on a bottom part of the body 10-1, and a speaker 10-5 provided on the body 10-1. Thereamong, the "menu screen page display button" 10-2 is a button for displaying a menu screen page (not shown) which displays icons showing various applications. The display part 10-3 includes a touch panel, and as a result of the user selecting a destination name from the destination list displayed as shown in FIG. 25, it is possible to carry out a telephone call with another cellular phone of another user.

Further, in the embodiment, as one example of content data, image data as sight data and voice data as hearing data have been described. However, it is not necessary to be limited thereto, and others of the five senses may be used instead. An example of content data may be touch data. In this case, a feeling occurring when a user touches something on the side of one of the terminals is transmitted to the side of another of the terminals. Further, content data may be smell data. In this case, a smell (or odor) obtained on the side of one of the terminals 10 is transmitted to the side of another of the terminals 10. Further, may be sufficient that content data is at least any one of image data, voice data, touch data and, smell data.

Further, in the embodiment, the case where the TV conference is conducted by using the transmission system 1 has been described. However, it is not necessary to be limited thereto. The transmission system 1 may be used for a meeting, a common conversation between family members, friends or such, or may be used for submitting information in one direction.

Although this invention has been described in detail with reference to certain embodiments, variations and modifications exist within the scope and spirit of the invention as described and defined in the following claims.

The present patent application is based on Japanese Priority Application No. 2010-267699 filed Nov. 30, 2010 and Japanese Priority Application No. 2011-192542 filed Sep. 5, 2011, the entire contents of which are hereby incorporated by reference.

The invention claimed is:

1. A transmission management system which, when content data is communicated among plural transmission terminals via a communication network, selects a relay apparatus which relays the content data, comprising:
  a memory configured to store transmission terminal identification information for identifying the transmission terminals, first attribute information indicating first attributes of the transmission terminals, and second attribute information indicating second attributes of the transmission terminals in a manner of associating them with each other;
  a processing circuitry configured to
    determine whether the first attributes of respective plural transmission terminals are the same based on the first attributes corresponding to the transmission terminal identification information for identifying the respective plural transmission terminals stored in the memory;
    determine whether the second attributes of the respective plural transmission terminals are the same based on the second attributes corresponding to the transmission terminal identification information for identifying the respective plural transmission terminals stored in the memory; and
  select a first relay apparatus when it is determined that the first attributes are the same, select a second relay apparatus when it is determined that the first attributes are not the same but the second attributes are the same, and select a third relay apparatus when it is determined that the first attributes are not the same and the second attributes are not the same; and
    wherein the first attribute is an attribute concerning respective parts of the communication network with which the transmission terminals are connected, and the second attribute is an attribute concerning respective areas where the transmission terminals are connected with the communication network.

2. A transmission system comprising:
  plural transmission terminals configured to communicate content data via a communication network;
  a relay apparatus configured to relay the content data; and
  the transmission management system claimed in claim 1.

3. The transmission system as claimed in claim 2, wherein:
  the first relay apparatus has the first attribute the same as those of the respective plural transmission terminals; and
  the second relay apparatus has the second attribute the same as those of the respective plural transmission terminals.

4. The transmission system as claimed in claim 2, wherein
  the first relay apparatus transmits first operating information indicating an operating state of the first relay apparatus;
  the second relay apparatus transmits second operating information indicating an operating state of the second relay apparatus; and
  the processing circuitry determines whether to select the first relay apparatus based on the first operating information and determines whether to select the second relay apparatus based on the second operating information.

5. The transmission system as claimed in claim 2, wherein
  the first relay apparatus transmits first port information indicating a state of ports of the first relay apparatus used for communication with the transmission terminals;
  the second relay apparatus transmits second port information indicating a state of ports of the second relay apparatus used for communication with the transmission terminals; and
  the processing circuitry determines whether to select the first relay apparatus based on the first port information and determines whether to select the second relay apparatus based on the second port information.

6. The transmission system as claimed in claim 4, wherein the first relay apparatus carries out secure communication with the transmission management system.

7. The transmission system as claimed in claim 5, wherein the first relay apparatus carries out secure communication with the transmission management system.

8. A non-transitory computer-readable medium storing a program for a transmission management system which, when content data is communicated among plural transmission terminals via a communication network, selects a relay apparatus which relays the content data, the program when executed by one or plural processors, causes the transmission management system, having a memory configured to store transmission terminal identification information for identifying the transmission terminals, first attribute information indicating first attributes of the transmission terminals, and second attribute information indicating second attributes of the transmission terminals in a manner of associating them with each other, to perform:
  determining whether the first attributes of respective plural transmission terminals are the same based on the first attributes corresponding to the transmission terminal identification information for identifying the respective plural transmission terminals stored in the memory; and
  determining whether the second attributes of the respective plural transmission terminals are the same based on the second attributes corresponding to the transmission terminal identification information for identifying the respective plural transmission terminals stored in the memory; and
  selecting a first relay apparatus when it is determined that the first attributes are the same, selecting a second relay apparatus when it is determined that the first attributes are not the same but the second attributes are the same, and selecting a third relay apparatus when it is determined that the first attributes are not the same and the second attributes are not the same; and wherein the first attribute is an attribute concerning respective parts of the communication network with which the transmission terminals are connected, and the second attribute is an attribute concerning respective areas where the transmission terminals are connected with the communication network.

9. A method for, when content data is communicated among plural transmission terminals via a communication network, selecting a relay apparatus which relays the content data, the method comprising:

selecting, by a transmission management system having a memory configured to store transmission terminal identification information for identifying the transmission terminals, first attribute information indicating the first attributes of the transmission terminals, and second attribute information indicating the second attributes of the transmission terminals in a manner of associating them with each other;

determining whether the first attributes of respective plural transmission terminals are the same based on the first attributes corresponding to the transmission terminal identification information for identifying the respective plural transmission terminals stored in the memory;

determining whether the second attributes of the respective plural transmission terminals are the same based on the second attributes corresponding to the transmission terminal identification information for identifying the respective plural transmission terminals stored in the memory; and selecting a first relay apparatus when it is determined that the first attributes are the same, selecting a second relay apparatus when it is determined that the first attributes are not the same but the second attributes are the same, and selecting a third relay apparatus when it is determined that the first attributes are not the same and the second attributes are not the same; and wherein the first attribute is an attribute concerning respective parts of the communication network with which the transmission terminals are connected, and the second attribute is an attribute concerning respective areas where the transmission terminals are connected with the communication network.

* * * * *